United States Patent
Jones et al.

(10) Patent No.: US 10,949,776 B2
(45) Date of Patent: Mar. 16, 2021

(54) SYSTEMS AND METHODS TO GENERATE FACILITY RECONFIGURATION PLANS THAT CAN BE USED TO RECONFIGURE ENERGY SYSTEMS OF FACILITIES TO ACHIEVE FINANCIAL OBJECTIVES

(75) Inventors: Vernon Rory Jones, Burlingame, CA (US); Stephen Louis Malloy, San Francisco, CA (US)

(73) Assignee: PlanetEcosystems, LLC, Port Washington, WI (US)

( * ) Notice: Subject to any disclaimer, the term of this patent is extended or adjusted under 35 U.S.C. 154(b) by 1087 days.

(21) Appl. No.: 13/226,292

(22) Filed: Sep. 6, 2011

(65) Prior Publication Data

US 2013/0060394 A1 Mar. 7, 2013

(51) Int. Cl.
 *G06Q 10/04* (2012.01)
 *G06Q 50/06* (2012.01)

(52) U.S. Cl.
 CPC .......... *G06Q 10/04* (2013.01); *G06Q 50/06* (2013.01)

(58) Field of Classification Search
 CPC .............................. G06Q 50/06; G06Q 10/04
 USPC .................. 705/1.1, 7.11–7.42, 400
 See application file for complete search history.

(56) References Cited

U.S. PATENT DOCUMENTS

| | | |
|---|---|---|
| 5,642,270 A | 6/1997 | Green et al. |
| 5,717,609 A | 2/1998 | Packa et al. |
| 6,134,511 A | 9/2000 | Subbarao |
| 6,900,738 B2 | 5/2005 | Crichlow |
| 6,996,508 B1 | 2/2006 | Culp et al. |
| 7,483,774 B2 | 1/2009 | Grichnik et al. |

(Continued)

FOREIGN PATENT DOCUMENTS

| | | |
|---|---|---|
| EP | 1286289 A2 | 2/2003 |
| EP | 2172887 A2 | 9/2009 |

OTHER PUBLICATIONS

Harvey, LD Danny. "Reducing energy use in the buildings sector: measures, costs, and examples." Energy Efficiency 2.2 (2009): 139-163 (Year: 2009).*

(Continued)

*Primary Examiner* — George Chen
(74) *Attorney, Agent, or Firm* — Vierra Magen Marcus LLP

(57) ABSTRACT

Provided herein are systems, methods and computer programs for generating a facility reconfiguration plan (FRP) useful to reconfigure a facility's energy system to achieve a financial objective. The facility's energy system and associated economics are characterized prior to any modifications. Additionally, there's a determination of which of a plurality of potential modifications, if any, is to be added to the FRP by determining which of the potential modifications provides a financial benefit useful to achieve the financial objective, and has a greatest financial attractiveness. The FRP is generated by repeating the aforementioned determination multiple times, wherein during iterations following an initial iteration, potential modification(s) already identified as providing a greatest financial attractiveness during previous iteration(s) is/are removed from consideration. This process can be repeated for different fuel price schemes, resulting in a separate FRP being generated for each fuel price scheme, with each FRP having a corresponding total financial value.

23 Claims, 10 Drawing Sheets

(56) References Cited

U.S. PATENT DOCUMENTS

| | | | |
|---|---|---|---|
| 7,580,817 | B2 | 8/2009 | Bing |
| 7,680,548 | B2 | 3/2010 | Khorramshahi |
| 7,880,641 | B2 | 2/2011 | Parris et al. |
| 7,991,513 | B2 | 8/2011 | Pitt |
| 2004/0059691 | A1 | 3/2004 | Higgins |
| 2005/0096797 | A1 | 5/2005 | Matsubara et al. |
| 2006/0200542 | A1 | 9/2006 | Willig |
| 2009/0055299 | A1 | 2/2009 | King |
| 2010/0042453 | A1 | 2/2010 | Scaramellino et al. |
| 2010/0070101 | A1 | 3/2010 | Benes et al. |
| 2010/0070102 | A1 | 3/2010 | Benes et al. |
| 2010/0145885 | A1 | 6/2010 | Graziano et al. |
| 2010/0207951 | A1 | 8/2010 | Plaisted et al. |
| 2011/0015798 | A1 | 1/2011 | Golden et al. |
| 2011/0016017 | A1 | 1/2011 | Carlin et al. |
| 2011/0029341 | A1 | 2/2011 | Muse et al. |
| 2011/0051823 | A1 | 3/2011 | Imes et al. |
| 2011/0106471 | A1 | 5/2011 | Curtis et al. |
| 2011/0153491 | A1 | 6/2011 | Williams |
| 2012/0010758 | A1* | 1/2012 | Francino et al. ............. 700/291 |

OTHER PUBLICATIONS

Winkelmann et al., "DOE-2 Supplement", Version 2.1E, Lawrence Berkeley Laboratory, Berkeley, CA. 94720; pp. 1.1 to 1.9., Dec. 1993.
http://www.tendrilinc.com/applications/energize/, 1 page, accessed Sep. 19, 2011.
http://opower.com/what-is-opower/analytics_portal/, 2 pages, accessed Sep. 19, 2011.
http://hes.lbl.gov/consumed, 1 page, accessed Sep. 19, 2011.
http://www.emeter.com/products/applications/energy-engage/, 2 pages, accessed Sep. 19, 2011.
http://www.aclaratech.com/AclaraSoft/pages/EnergyAnalyses.aspx, 2 pages, accessed Sep. 19, 2011.
http://www.apogee.net/homeEnergySuite.aspx, 1 page, accessed Sep. 19, 2011.
http://efficiency20.com/recommendations, 2 pages, accessed Sep. 19, 2011.
http://www.energysavvy.com/, 3 pages, accessed Sep. 19, 2011.
http://www.snugghome.com/, 3 pages, accessed Sep. 19, 2011.
http://www.recurve.com/, 2 pages, accessed Sep. 19, 2011.
http://www.solarcity.com/energy-efficiency/innovation.aspx, 2 pages, accessed Sep. 19, 2011.
Notification Concerning Transmittal of International Preliminary Report on Patentability and Written Opinion, dated Mar. 20, 2014, in International Appl. No. PCT/US2012/052644 filed Aug. 28, 2012.
Notification of Transmittal of the International Search Report and the Written Opinion, dated Nov. 20, 2012, in International Appl. No. PCT/US2012/052644 filed Aug. 28, 2012.
Notification of Transmittal of the International Search Report and the Written Opinion, dated Dec. 6, 2012, in International Appl. No. PCT/US2012/052644 filed Aug. 28, 2012.
Amendment filed Dec. 15, 2015, in International Appl. No. PCT/US2012/052644 filed Aug. 28, 2012.
Office Action dated Jun. 1, 2016 in European Patent Application No. 12830403.7.
Supplementary EP Search Report dated May 18, 2015, in European Patent Appl. No. 12830403.7 filed Aug. 28, 2012.
Communication Pursuant to Rules 70(2) and 70a(2) EPC dated Jun. 5, 2015, in European Patent Appl. No. 12830403.7 filed Aug. 28, 2012.
Office Action dated Dec. 16, 2016 in European Patent Application No. 12830403.7.
Response to Office Action filed Nov. 14, 2016 in European Patent Application No. 12830403.7.

* cited by examiner

Figure 1: Energy System Configuration Tool – Key Components & Processes

Figure 2: Energy Model – Key Components & Processes

Energy System Economic Optimization Algorithm – Key Components & Processes

Figure 4: ACM Assessor – Key Components & Processes

Figure 5: Reverse Tiered Pricing Scheme and Marginal Price Allocation Illustration Energy System Economic Optimization Algorithm – Iterative Process Illustration Figure 7: An Example of an ESE Input Screen of one Embodiment Figure 8: An Example of a Preferences Input Screen of one Embodiment

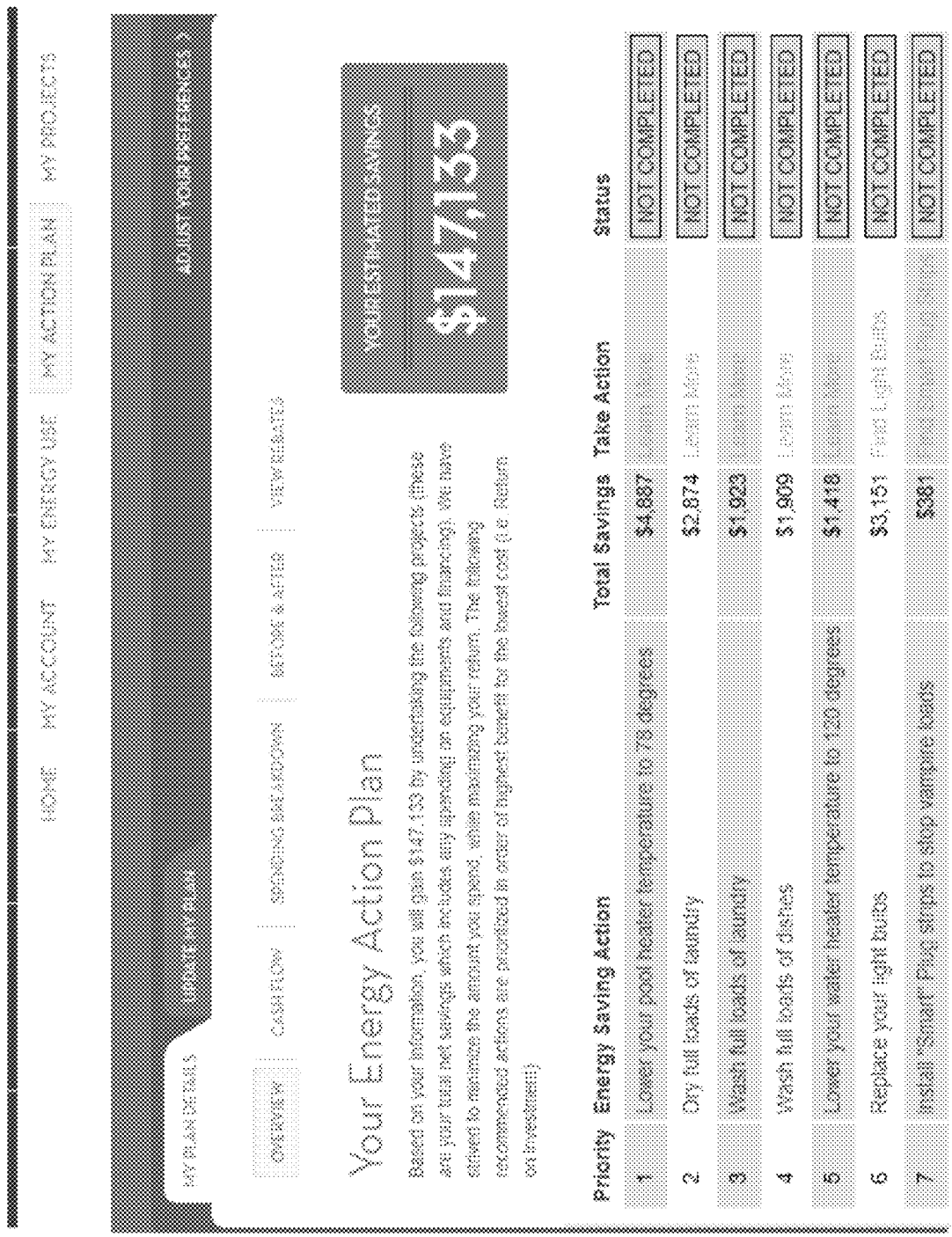
Figure 9: An Example of an FRP Publication Screen of one Embodiment

SYSTEMS AND METHODS TO GENERATE FACILITY RECONFIGURATION PLANS THAT CAN BE USED TO RECONFIGURE ENERGY SYSTEMS OF FACILITIES TO ACHIEVE FINANCIAL OBJECTIVES

FIELD OF THE INVENTION

Embodiments of the present invention generally relate to systems and methods that develop plans to alter the design/configuration of energy related systems, known as "energy systems," at a facility.

BACKGROUND OF THE INVENTION

Nearly every facility has an energy system, perhaps incorporating, by example: lighting equipment; kitchen appliances, such as a dishwasher; household appliances, such as a clothes dryer; insulates, such as attic insulation; heating ventilation and air conditioning equipment, such as a forced air furnace and an air conditioner; other appliances and equipment, such as a swimming pool filter pump; and fuel sourcing equipment, such as a photovoltaic solar panel system that generates electricity. The appliances and equipment in such an energy system are typically configured with a principal emphasis on achieving certain operating performance needs and/or limiting or minimizing installation and/or set up and/or other costs. However, this rarely satisfies the financial objective of a homeowner, facility operator, etc.

BRIEF SUMMARY OF THE INVENTION

The energy related appliances and equipment in use in most facilities today are typically configured with limited regard to the economic performance of the energy system. This has resulted in a preponderance of facilities where the energy system's economics are not economically optimized as they would be should all or nearly all applicable and/or relatively important factors be properly considered including, but not limited to; (a) costs of fuel, such as electricity, natural gas, propane gas, fuel oil, combustible wood and others; (b) operating costs; (c) alternative appliance and equipment opportunities (both energy sourcing and energy consuming, or using); (d) costs to implement any changes that may be needed to affect the opportunities; (e) costs of capital and financing; and other factors.

As fuel costs have and continue to rise, it is increasingly economically advantageous to replace and even install additional energy related appliances and equipment, due to the reduced fuel use and/or increased fuel source characteristics of alternative energy related appliances and equipment. However, with (a) the complexity of the technologies involved in an energy system; (b) the growing existence of complex fuel pricing structures, such as those of utility supplied fuels; (c) the availability of a multitude of government and other grants, rebates and incentives for facility energy system reconfigurations; (d) the availability of a multitude of financing options for facility energy system reconfigurations; and (e) the lack of facility operator awareness of how appliance and equipment operating and usage traits impact the economics of energy system operations; among other factors, operators of facility energy systems find it prohibitive to conduct the computations needed to develop plans to reconfigure the energy system of their facilities such as to maximize or near maximize financial performance toward a financial objective.

Some tools and expert advisory capabilities are available today to assist facility operators with configuring and/or reconfiguring facility energy systems. These tools and expert advisory capabilities are typically oriented around improving an understanding of the properties of the energy system at a facility. While some of the tools and expert advisory capabilities available today present some economics of undertaking reconfiguration measures, these tools and expert advisory capabilities possess significant shortcomings including, but not limited to, one or more of the following:

They fail to produce plans that are oriented around delivering an optimized or near optimized energy system reconfiguration.

They fail to simultaneously consider multiple types of reconfigurations such as; efficiency (where equipment with reduced net energy costs may add to or replace existing equipment, with little or no change in function or performance), behavioral change (where changes in equipment operating parameters would lessen net energy costs, with little or no change in function or performance); and energy substitution (where equipment capable of net energy production, such as photovoltaic solar panel systems, is installed to produce energy of lower cost than the existing energy available).

They fail to automatically compute the economics of a simultaneous implementation of multiple measures; such as in the circumstance where the installation of insulation may reduce the consumption of a fuel, which, in turn, may render the economics of changing a heater as unattractive.

They fail to analyze and report the true financial value of undertaking energy system reconfiguration measures as they apply fuel prices improperly; instead of correctly applying structured fuel prices on a marginal basis, and using the associated results to compute facility reconfiguration optimization decisions, they apply fuel prices that are blended across the applicable fuel price structure, are arbitrarily set within a range, or are erroneous in some other fashion.

They ignore the facility operator's preferences, desires, situation, lifestyle, operating needs and/or wants, among other factors.

They ignore or improperly consider the effects of financing alternatives and the time value of money.

They fail to address or erroneously consider the complexities of combinations of multiple applicable grants, rebates and incentives in circumstances where multiple measures are implemented.

Among other functions, embodiments of the present invention address and properly consider many, and preferably all, of these and other shortcomings of existing tools and expert advisory facilities in an integrated manner. More specifically, in accordance with embodiments of the present invention, actual economics are properly computed and considered, in an integrated fashion, and a reconfiguration plan is developed that improves, and preferably optimizes, the subject facility's energy system such as to maximize or near maximize its financial performance toward a financial objective.

Specific embodiments of the present invention generally relate to methods and systems that generate a facility reconfiguration plan (FRP) that can be used to reconfigure an energy system of a facility to achieve a financial objective. The financial objective, for which the FRP can be used to achieve, can include one of the following, but is not limited thereto: maximize wealth associated with the energy system, maximize changes to the energy system given a specified budget, minimize carbon footprint of the energy system given a specified budget, minimize dependency of the energy system on one or more specified fuel sources given a specified budget, or offset a loss of wealth associated with implementing a specified desired modification to the energy system.

Information that characterizes the energy system of the facility and associated economics, prior to any modifications, is determined or otherwise obtained. Additionally, information regarding a plurality of potential modifications to the energy system of the facility is determined or otherwise obtained.

In accordance with specific embodiments, one or more future preferences is/are obtained, wherein the future preference(s) specify a willingness and/or unwillingness to implement one or more specific potential modifications. Based on such future preference(s), one or more of the potential modifications is/are eliminated, added, bundled, prioritized or adjusted.

To determine which one of the potential modifications, if any, is to be added to the FRP, there is a determination, for each potential modification, whether the potential modification provides a financial benefit that can be used to achieve the financial objective. In accordance with an embodiment, such a determination of whether a potential modification provides a financial benefit is a binary determination whose result is either yes or no. There is also a determination of a financial attractiveness corresponding to each potential modification that provides a financial benefit that can be used to achieve the financial objective, thereby enabling the identification of the potential modification having a greatest financial attractiveness, which is added to the FRP. To generate the FRP, this process of identifying which of the potential modification(s) is/are to be added to the FRP, is repeated a plurality of times. During each iteration of this process (that follows an initial iteration), every potential modification that was identified as providing a greatest financial attractiveness during a previous iteration (and thus, has already been added to the FRP) is removed from consideration. This process can be repeated until no remaining potential modification provides a financial benefit that can be used to achieve the financial objective, or until every potential modification has already been included in the FRP.

In accordance with specific embodiments of the present invention, the resulting FRP can be published, such that the published FRP includes: a list of the potential modifications included in the FRP, the financial value of each potential modification included in the FRP, an indication of the financial attractiveness of each potential modification included in the FRP, and/or the total financial value of all the potential modifications included in the FRP. Publishing the FRP can be performed by displaying the FRP, producing a printout of the FRP and/or passing the FRP to another system, sub-system or software component, but is not limited thereto.

In accordance with specific embodiments, the information that characterizes the energy system of the facility and associated economics prior to any modifications includes fuel pricing structure information and corresponding pricing level information, wherein at least one fuel pricing structure comprises a tiered pricing structure (TPS) having at least two pricing levels. Such a TPS can be, e.g., a reverse tiered pricing structure (RTPS), but is not limited thereto. During a first iteration of the above described process of generating an FRP, determinations of whether potential modifications provide a financial benefit, and determinations of financial attractiveness and financial value, take into account whether and to what extent one or more of the potential modifications cause a transition between different pricing levels of the TPS. During each further iteration of the above described process of generating an FRP, determinations of whether potential modifications provide a financial benefit, and determinations of financial attractiveness and financial value, take into account how all previous iterations of the process have adjusted marginal prices associated with the TPS that are applicable to the current iteration of the process.

Where more than one pricing scheme is being considered, a separate FRP can be produced for each of the different pricing schemes. More specifically, the above described iterative process of generating an FRP can be performed for each pricing scheme, and a total financial value corresponding to each separate FRP can be determined to thereby enable the separate FRPs to be compared to one another.

There are numerous different ways that financial attractiveness can be determined, and depending upon implementation, a user can select which way to determine financial attractiveness. Alternatively, there can be a default definition for financial attractiveness that is always used, or used unless changed. For example, the financial attractiveness can determined by determining one of the following, but is not limited thereto: a net operating gain metric equal to an operating gain nominal value less no implementation cost; a net operating gain metric equal to an operating gain nominal value less some implementation cost nominal value; a net operating gain metric equal to an operating gain nominal value less all implementation cost nominal value; a net operating gain metric equal to an operating gain present value; a net operating gain metric equal to an operating gain present value less some implementation cost present value; a net operating gain metric equal to an operating gain present value less all implementation cost present value; a capital efficiency ratio metric equal to a net operating gain divided by some implementation cost nominal value; a capital efficiency ratio metric equal to a net operating gain divided by all implementation cost nominal value; a capital efficiency ratio metric equal to a net operating gain divided by some implementation cost present value; a capital efficiency ratio metric equal to a net operating gain divided by all implementation cost present value; an extent of reducing carbon footprint or creating a carbon offset within a specified budget; or an extent of reducing net demand (or increasing net supply) of one or more specified fuel with respect to and external vendor (or buyer) within a specified budget. The specific financial attractiveness that is appropriate to generate an FRP may be dependent upon the specific financial objective. However, there are certainly more than one way of determining financial attractiveness that can be appropriate for a specified financial objective. Additionally, there are numerous different ways that financial value can be determined.

This summary is not intended to summarize all of the embodiments of the present invention. Further and alternative embodiments, and the features, aspects, and advantages of the embodiments of invention will become more apparent from the detailed description set forth below, the drawings and the claims.

BRIEF SUMMARY OF THE DRAWINGS

FIG. 7 illustrates an exemplary Energy System Element (ESE) input screen of a user interface, according to an embodiment of the present invention.

FIG. 8 illustrates an exemplary future operating preferences input screen of a user interface, according to an embodiment of the present invention.

FIG. 9 illustrates an exemplary published Facility Reconfiguration Plan (FRP), generated in according to an embodiment of the present invention.

DETAILED DESCRIPTION OF THE INVENTION

Figure 1:
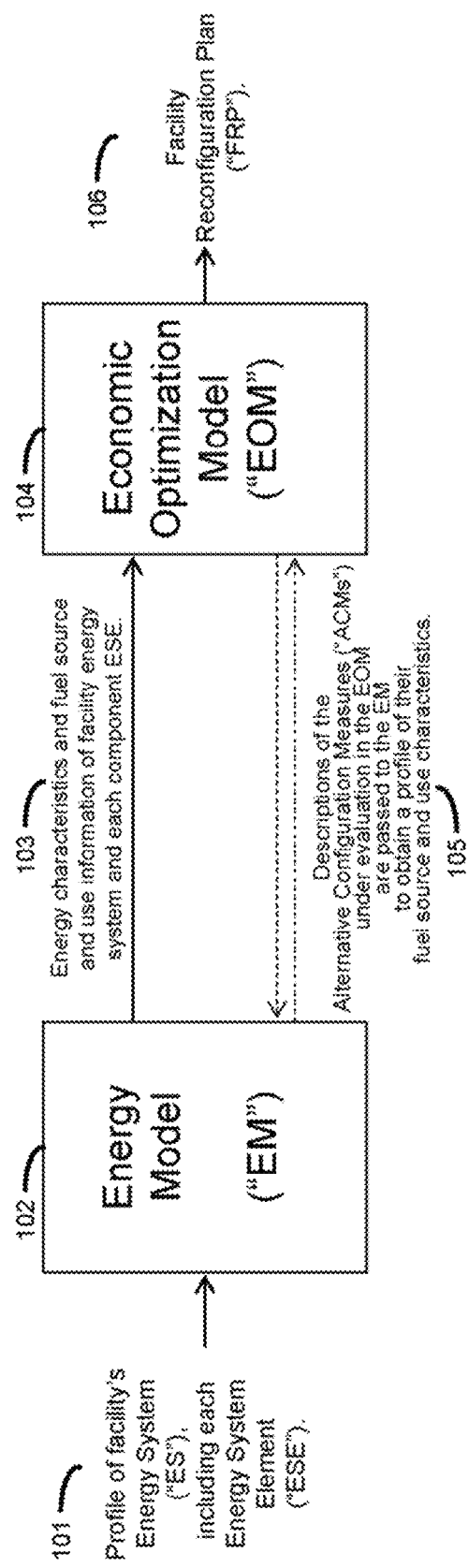
FIG. 1 is a high level block diagram that depicts principal components of an Energy System Configuration (ESC) tool, according to an embodiment of the present invention.

Before describing some exemplary embodiments of the present invention, a list of acronyms used in the present application is provided in alphabetical order.

LIST OF ACRONYMS

ACM Alternative Configuration Measure
AIEP As-Is Energy Profile
AIESC As-Is Energy System Configuration
EM Energy Model
EOM Economic Optimization Model
ESC Energy System Configuration
ESE Energy System Element
ESEOA Energy System Economic Optimization Algorithm
FODR Facility Operator's Discount Rate
FRP Facility Reconfiguration Plan
HVAC Heating Ventilation and Air Conditioning
RTPS Reverse Tiered Pricing Structure
SACM Successful ACM
TBEP To-Be Energy Profile
TBESC To-Be Energy System Configuration
TPS Tiered Pricing Structure
TOU RTPS Time-Of-Use RTPS Collectively, the systems, methods and computer programs described herein can be referred to as the Energy System Configuration (ESC) tool. The ESC tool's intended users include facility operators, owners, advisors and service providers, governmental and other policymakers and regulators, fuel vendors, and utility companies among others.

Certain embodiments of the present invention include a system and method for the development of a plan for facility operators and/or others to follow, to reconfigure the energy system of a facility in a manner that delivers maximized or near maximized financial performance toward a financial objective, with limited, if any, noticeable change to the output or function of that energy system, if so desired, or with such output and/or function changes as they stipulate.

The types of facilities addressed include, but are not limited to, residential, commercial and industrial facilities.

The maximizing or near maximizing of financial performance toward a financial objective may be defined and set in numerous ways and made selectable by a user, administrator and/or manager, depending on the embodiment, of the ESC tool, including, but not limited to: (a) maximizing or near maximizing financial wealth that would result from any reconfiguration of the subject facility's energy system, within any boundaries specified for a reconfiguration, including the net costs that may be required to affect such reconfiguration, while doing so with the minimum or near minimum proportion of those monetary outlays; (b) maximizing or near maximizing financial wealth that would result from a reconfiguration of the subject facility's energy system, excluding costs that may be required to affect such reconfiguration; (c) altering the design/configuration of the subject facility's energy system such that the carbon footprint of the system is minimized or near minimized while maintaining or improving the financial performance in some manner of the facility's energy system (again, either including or excluding costs that may be required to affect any reconfiguration of the subject facility's energy system from consideration); (d) altering the design/configuration of the subject facility's energy system such that the comfort or other needs of the operators of the facility's energy system are optimized or near optimized, or adjusted to meet some other objective while maintaining or improving the financial performance of the facility's energy system (again, either including or excluding cost that may be required to affect any reconfiguration of the subject facility's energy system from consideration); (e) altering the design/configuration of the subject facility's energy system to specified limiting specifications such that a specified payback period of any monetary outlay is, or near achieved; (f) altering the design/configuration of the subject facility's energy system to, or near to, specified limiting specifications such that a specified budget for any monetary outlay or periodic fuel or other ongoing monetary spending amount is, or near, achieved.

A facility's existing energy system may include a number of discrete energy related appliances and equipment, each of which are known individually as an Energy System Element (ESE). Examples of ESEs include, but are not limited to:

(a) Stand-alone equipment that may be plugged in, such as:
  lighting equipment;
  kitchen appliances, such as a dishwasher;
  household appliances, such as a clothes dryer;
(b) Built-in equipment that is fixed in place, such as:
  Heating Ventilation and Air Conditioning, known as "HVAC," equipment, such as a forced air furnace and an air conditioner;
(c) Integral parts of the subject facility's structure that play a role in the function of the subject facility's energy system, such as:
  a ceiling and any insulation that may be associated with it in an attic;
  a swimming pool filter pump; and
(d) Fuel sourcing equipment, such as:
  a photovoltaic solar panel system.

For the purposes of illustrating the operation of an embodiment of the present invention, examples will be presented showing an application of the ESC tool's system and method to a facility comprising the first seven of the foregoing eight ESEs (that is, excluding the photovoltaic solar panel system); where alternatives to those seven ESEs are available for sale and installation in the market and may operate with superior energy efficiency characteristics; and where photovoltaic solar panel systems are also available for sale and installation in the market.

In certain embodiments, the present invention achieves its object of developing facility reconfiguration plans using two groups of computations, as set out in FIG. 1, mostly sequentially and iteratively. First, a profile 101 of the subject facility's energy system's design/configuration is captured and input to the Energy Model (EM) 102. The EM 102 performs a first group of computations to thereby generate an output 103, a characterization of the subject facility's energy system and its sources and uses of fuels. The output 103 from the EM 102 is passed to an Economic Optimization Model (EOM) 104, which performs a second group of computations.

In the illustrative example, the profile 101 of the subject facility's energy system's design/configuration might include a list of the seven ESEs at the facility, perhaps including the make, model number, year of manufacture, fuel and operating consumption rate, certain details on how each ESE is used and operated, certain details on how each ESE interacts with other ESEs, among other factors. That profile 101 might also include a description of the actual fuel use, such as historical, at the subject facility and/or of each ESE, together with the fuel pricing structure applied to each.

The EOM 104 first uses this characterization of the subject facility's energy system and its sources and uses of fuels, such as electricity, natural gas, propane gas, fuel oil, combustible wood and others, to compute the economic characteristics of the subject facility's existing energy system, and the economic characteristics of each ESE. This economic characterization is initially computed in a manner that is based on the subject facility operator's actual usage and operating characteristics of the ESEs, known as "operating parameters."

In the illustrative example, the energy consumption of the dishwasher could be computed by using its make and model number information to retrieve from its manufacturer per-use fuel consumption information, and use that information, together with total usage counts over a temporal period to compute the fuel consumption associated with operating that dishwasher. Notably, this may be electricity to affect the mechanics of the dishwasher itself, and gas that may be used to heat the water used by the dishwasher. With fuel pricing information, the cost of the fuel consumed is computed.

Next, the EOM 104 determines and evaluates the relative financial performance of alterations to the design/configuration of the subject facility's energy system and it's ESEs in an incremental manner, iteratively. Each measure that can instituted as an incremental alteration to the existing design/configuration of the subject facility's energy system is known as an Alternative Configuration Measure (ACM).

Each ACM, were it implemented, may cause the subject facility to possess different energy and/or fuel source and/or use characteristics. ACMs achieve this by altering one or more ESEs, by addition, replacement, adjustment of performance characteristics, adjustment of operating and/or usage profiles, or by some other means. Based on the information supplied, including by the tool's user, administrator and/or manager, the ESC tool compiles a list and profile of ACMs to be evaluated as though they were instituted at the subject facility. This list and profile is also recompiled at several other junctures elsewhere in the computational process in a manner that reflects conditions and opportunities current at those other junctures.

A list of ACMs may be already configured and defined within the ESC tool. In addition, the ESC tool may collect from the ESC tool's user, administrator and/or manager the ESC tool preferences as to what ACMs are to be excluded from the ESC tool's evaluations, and what ACMs are to be included in the ESC tool's evaluations. Those ACMs that are added may be new original designs, may be designs that are adjusted by the ESC tool's user, administrator and/or manager of the ESC tool, whether those adjustments relate to how equipment and/or appliances perform, how they are operated, the timing of implementation, implementation needs, monetary outlays and/or financing terms (including debt terms, opportunity costs, down payments and other factors) they would be subject to if implemented, and/or other factors.

In the illustrative example, all seven ESEs have convenient replacements, each with varying levels of relative fuel consumption in comparison with their counterparts as a result of superior energy efficiency characteristics. For example, a similar performing dishwasher may be available on the market that requires only 80% of the electricity to run as the existing dish washer. Moreover, the facility operator may have a dislike for superior energy efficiency lighting equipment due to their color or start up characteristics, and may choose to exclude the replacement of lighting from the list of ACMs to be evaluated by the ESC tool; however, the other ESE replacements remain on the list, together with a new device that is to be considered for installation, such as a photovoltaic solar panel system for the potential production of electricity.

The design/configuration of the energy system in its original state, prior to any adjustments that may be planned by the ESC tool, is known as the As-Is Energy System Configuration (AIESC). The design/configuration of the energy system in a state that assumes alterations planned by the ESC tool are incorporated, both during and at the conclusion of the ESC's computations, is known as a To-Be Energy System Configuration (TBESC).

In accordance with an embodiment, the EOM 104 performs evaluations that include, but are not limited to: (a) evaluations of an extensive and preferably exhaustive set of ACMs; (b) evaluations of ACMs utilizing systems and methods that accurately or near accurately consider the energy interactions and other effects with other ACMs, in an integrated fashion, as described subsequently; (c) evaluations of ACMs utilizing accurate or near accurate costs of implementing ACMs over and within suitable and appropriate time periods (this can include economic evaluations of any replacement, new equipment and installation costs, netted against all or nearly all relevant and appropriate grants, rebates and incentives, and incorporating financing costs, and economic changes resulting from changes in operating usage and future fuel source and use profiles, but is not limited thereto); and (d) evaluations of the economic performance of each ACM computed based on the marginal price, utilizing whatever metric is in force in the respective fuel pricing scheme, for the relevant fuel or fuels sourced or used at the subject facility operating under the AIESC in the first set of evaluation computations, or TBESC for subsequent evaluation computations, which can be distributed across multiple marginal price tiers. As the term is used herein, a marginal price is that price at which the next unit may be bought or sold. Whilst marginal price is a constant in circumstances where a fixed price structure is in effect, in a variable pricing structure (such as a tiered or curve structure) where price varies dependent on some metric, such as the volume of a product and/or service bought or sold in some defined temporal period, the marginal price is that price in force at that upper level of volume demand or supply applicable to a particular customer-supplier relationship.

The plan developed by the ESC tool, for use by facility operators and others to follow to reconfigure the energy system of their facility in a manner that delivers maximized or near maximized financial performance toward a financial objective, is referred to as the Facility Reconfiguration Plan (FRP) 106.

An extensive number of ACMs is preferable to enhance the development of a superior performing FRP. ACMs are compiled with specific and sufficient information to ensure a proper evaluation of financial performance, including financial benefit, financial attractiveness and financial value; the factors addressed are often specific to the ESE or ESEs under consideration. The information needed to allow this is referred as an ACM Design record. Each ACM is evaluated in turn to determine which, if any, has financial benefit, and of those that have financial benefit which has the greatest financial attractiveness and may be selected to be part of the FRP. These evaluations are executed in a series of evaluations known as ACM Iterations, which continue until all ACMs selected for consideration have been evaluated by the EOM 104.

Further, the ESC tool's user, administrator and/or manager may also create bundles of ACMs. For example, a bundle of ACMs can be configured to reflect the specifications needed to comply with programs, incentive or otherwise, that may be stipulated and/or made available by utility companies, policy makers, government, regulators, policymakers and/or others. Such programs include, but are not limited to, demand response incentives, multiple appliance and/or equipment replacement and/or acquisition incentives, such as the Whole House program in California and similar programs, and others.

In the illustrative example, an example of such a program may be a local governmental organization offering grants for facility operators to implement measures that would result in a certain threshold of fuel consumption reduction, e.g., a 10% reduction, to subsidize the installation of a photovoltaic solar panel system.

By collecting such ACM preferences and edits prior to conducting its computations, the ESC tool is able to develop an FRP that properly optimizes or near optimizes options the subject facility's operator is actually likely to implement, avoiding erroneous computations whereby value is improperly assigned to options the subject facility's operator will not be willing to actually implement.

There are several groups of ACMs with substantial commonality among the ACMs within each group including, but not limited to: an Efficiency ACM (EACM); an Energy Supply ACM (ESACM); and a Behavioral ACM (BACM), each of which is discussed below.

An Efficiency ACM (EACM) is a measure that may be implemented at the subject facility to change its energy system design/configuration, or some other factor, by the installation or some other alteration of one or more ESEs (often, but not always, by ESE replacement, addition, subtraction or adjustment), such that the subject facility's energy system assumes superior energy economics (often, but not always, by improving energy efficiency characteristics). In the illustrative example, examples of such energy system design/configuration changes include, though are not limited to: (a) replacing lighting equipment, such as incandescent bulbs, perhaps with similar performing lighting equipment, such as compact fluorescent light bulbs, though with beneficial fuel use economics; (b) replacing kitchen or household appliances, such as a clothes dryer, perhaps with similar performing appliances, though with beneficial fuel use economics (notably, this may be from lower fuel use of more efficient appliances, and/or may be from lower fuel costs in cases where fuel change opportunities are under consideration, such as a clothes dryer which may be powered by electricity in the existing facility energy system, and a gas powered alternative is included for consideration as a potential replacement where gas may be a relatively less costly source of heat energy); (c) replacing consumer, commercial or industrial equipment with similar performing equipment, though with beneficial fuel use economics (again, this may be from lower fuel use of more efficient equipment, and/or may be from lower fuel costs in cases where fuel change opportunities are under consideration); (d) installing additional insulation in an attic, walls and/or floors, to perhaps reduce a facility's structure's heat loss (at times when the structure is using fuel for heating purposes) or heat gain (at times when the structure is using fuel for cooling purposes); and (d) replacing HVAC equipment with perhaps similar performing equipment, though with beneficial fuel use economics (again, this may be from lower fuel use of more efficient equipment, and/or may be from lower fuel costs in cases where fuel change opportunities are under consideration, and/or some other means).

An Energy Supply ACM (ESACM) is a measure that may be implemented at the subject facility to provide or increase a supply of fuel or energy to the subject facility's energy system that may be used in addition or substitution to other fuel or energy supplies, should the financial performance be favorable. In the illustrative example, an example of such a supply measure is the electricity that can be supplied through the deployment and operation of photovoltaic solar panel equipment, whereby sunlight is converted to usable electricity. Other examples include solar domestic water heaters, where the sun's heat energy is used to heat water in substitution of some fuel (such as electricity in circumstances where an electric immersion heater may be in use) that would otherwise have to be purchased; solar swimming pool water heaters where the sun's heat energy is used to heat water in substitution of some fuel (such as natural gas) that would otherwise have to be purchased; and others, such as geothermal and other energy sources.

A Behavioral ACM (BACM) is a measure the subject facility operator can implement by adjusting the subject facility's, its energy system's, and/or one or more ESE's operating parameters. In the illustrative example, an example of operating parameter changes may include, but are not limited to: (a) reducing the amount of time subject energy consuming equipment, such as a heating furnace, is operated; (b) reducing the number of times subject energy consuming equipment, such as a dishwasher, is operated in a given period of operation (requiring an increase in the capacity utilization of the subject equipment should no changes in throughput be desirable by the subject facility operator); and (c) increasing the amount of time subject energy supply equipment is operating such as to increase its operating utilization, such as adjusting the angle of photovoltaic solar panels in relation to the sun's path in the sky from one season to another.

Some ACMs may exhibit traits of several of these groups simultaneously.

The EOM 104 utilizes the EM 102 to re-compute the energy characteristics of relevant ESEs as needed when each ACM and its ACM Design is evaluated (represented at 105) in each ACM Iteration, since each ACM potentially alters the energy characterizes of an ESE which may in turn alter the energy characteristics and performance of other ESEs. This is a particularly useful and important consideration for evaluations of such ESEs as those interacting with a facility's HVAC equipment and other thermal related ESEs, but is important in many other circumstances where ESEs interact. In the illustrative example, adjustments to increase the insulation in an attic will likely materially reduce the fuel consumption of the heating furnace; therefore the economic benefit of also replacing the heating furnace with a more efficient alternative would be substantively reduced. Conversely, replacing the heating furnace with a more efficient alternative will likely materially reduce its fuel consumption; therefore the economic benefit of also increasing the insulation in an attic would be substantively reduced.

The EOM 104 evaluates ACMs based on assigning to each ACM computation a marginal price (or prices, should the relevant fuel source or use be distributed across multiple contiguous applicable marginal price tiers), for each relevant pricing period for the relevant period of evaluation.

After the EOM 104 evaluates the listed ACMs, the EOM 104 determines if any ACM has any financial benefit to the subject facility operator. Should none of the ACMs be determined as offering a financial benefit, the process is halted and a report indicating such is made in the FRP. This may trigger the conductance of other evaluations based on some other fuel price scheme, that scheme perhaps comprising a bundle, perhaps including alternative combinations, of fuel pricing structures that have been included for evaluation.

However, should one or more ACMs be determined as having financial benefit, the EOM 104 selects the ACM having the greatest financial attractiveness. This ACM is known as the Successful ACM 1 (SACM 1). Next, the EOM 104 sets SACM 1 as first on the list of measures in the FRP, relating to the fuel price scheme under consideration. At that juncture the first iteration of the EOM's evaluations of ACMs, known as the first FRP Iteration, is complete. Publishing the FRP can be performed by displaying the FRP, producing a printout of the FRP and/or passing the FRP to another system, sub-system or software component, but is not limited thereto.

In the illustrative example, the EOM 104 may select the replacement of the facility's swimming pool filter pump as SACM 1. The existing swimming pool filter pump, which has an electricity usage rate of 1.0 kilowatt (kW), is operated for 6 hours daily; therefore consuming a total of 6.0 kilowatt-hours (kWh) daily. However, an alternative replacement swimming pool filter pump which has an electricity usage rate of only 0.1 kW, though requires operation 24 hours per day to deliver a similar performance as the existing swimming pool filter pump and operation; therefore consuming a total of only 2.4 kWh daily. The reduction in electricity demanded by implementing this measure over one month is 108 kWh; in a marginal price structure for electricity that is billed monthly, where the facility is paying a marginal price of 50 cents per kWh, this elimination of electricity consumption would have a monthly monetary value of $54.00.

Moreover, continuing in this illustrative example, assume financial objective is defined so as to maximize outlaid capital efficiency, and where financial value gained is defined as fuel cost savings for each period over the life of the ACM, less monetary outlays and associated payments, each discounted to their present values and summed, divided by monetary outlays. The financial value of this ACM is the fuel savings of $54 monthly over the 13 year life of the swimming pool filter pump in question. Since fuel prices are expected to increase over those 13 years, the actual monthly gain will grow over time, and is calculated based on specific and increasing price forecasts. Assuming the replacement swimming pool filter pump costs $2,000 to purchase and install, offset by $500 in utility company incentives, the initial net outlay is $1,500. In the circumstance where this is to be financed with debt, comprising 13 years of fixed monthly payments of, say, $25 monthly, then those payments are deducted from the financial value computed for each month of the replacement swimming pool filter pump's electricity payments over its 13 year life. The residual amounts for each month are then discounted to compute their present values and summed; in this circumstance assume that net present value amounts to $10,000. Since the outlay is $1,500, the outlaid capital efficiency ratio is 6% (i.e., $10,000/$1,500=6.666). Since the outlaid capital efficiency ratio of the other 6 ACMs was less than this, the replacement of the facility's swimming pool filter pump is selected as SACM 1.

The marginal price (or prices, should the relevant fuel source or use be distributed across multiple contiguous and applicable marginal price tiers) for each relevant pricing period for the relevant period of evaluation for the specific marginal source or use of each relevant fuel type considered in the economic evaluation computation of SACM 1 is then allocated to SACM 1 and is removed from residuals such as not to be available to be used in, or allocated to, economic computations involving any other ACM that may be considered in any subsequent FRP Iterations involving the current fuel price scheme.

In addition, that specific ACM, SACM 1, is itself also not available for consideration in any subsequent FRP Iterations involving the current fuel price scheme.

In the illustrative example, assume that the electricity saved by replacing swimming pool filter would result in the facility exiting the top price tier, out of five price tiers (of a reverse tiered pricing scheme), for its utility supplied electricity. Since evaluations of further ACMs must be based on an energy system design/configuration at the subject facility that assumes the implementation of SACM 1, then the next marginal price tier will be applied to any savings that may be attributed to those ACMs, which is the fourth level for its utility supplied electricity, prices electricity at, e.g., 40 cents per kWh. Moreover, since there is only one swimming pool filter pump at the subject facility, and the replacement swimming pool filter pump under consideration is capable of fulfilling the same function with the same result as the existing swimming pool filter pump, there is only one ACM that calls for its replacement, and so that ACM is removed from the list of ACMs as a candidate for subsequent consideration.

Subsequently, the EOM 104 adjusts the ESC's current characterization of the subject facility's energy system design/configuration to incorporate the characteristics of SACM 1, creating a new TBESC, and the EOM 104 commences another round of evaluations of ACMs to determine if any other ACMs have any additional financial benefit to the subject facility's operator based on that TBESC. This second set of EOM evaluations of ACMs, each within their own ACM Iterations, is known as the second FRP Iteration.

Should none of the ACMs evaluated in this second FRP Iteration be determined as offering financial benefit, the process is halted and a report indicating such is made to the FRP. Again this may trigger the conductance of other evaluations based on some other fuel price scheme, that scheme perhaps comprising a bundle, perhaps including alternative combinations, of fuel pricing structures that have been included for evaluation. However, should one or more further ACMs be identified as having additional financial benefit, the EOM 104 selects that ACM having the greatest financial attractiveness. This selected ACM is known as SACM 2.

Once again, the marginal price for that level of the subject facility's use of each relevant fuel type is allocated to SACM 2 and removed from residuals such as not to be available to be used in, or allocated to, economic computations involving any other ACM that may be considered at a later stage of the EOM's evaluations. In addition, that specific ACM, SACM 2, is also itself not available for consideration in further EOM evaluations.

The EOM 104 repeats the evaluation and selection of ACMs, adding to the list of SACMs under a sequential numeration scheme in the FRP, in further FRP Iterations, until no further ACM offers financial benefit; at which point the process is halted and a report indicating such is made, together with the FRP that has been compiled to that juncture.

Again, in circumstances where the subject facility's operator is able to choose among more than one price scheme for one or more of the fuels it sources or uses, then the ESC tool conducts the entire set of computations described previously for each combination of applicable fuel price schemes, such as to compile a FRP for each. Each run of computations to determine a complete FRP is known as a Price Scheme Iteration. In accordance with an embodiment, the ESC tool compares the summed total financial value of each Price Scheme Iteration and, depending on the embodiment and functionality desired and selected by the ESC tool's user, administrator and/or manager, may select that Price Scheme Iteration with the greatest total financial value. It is noted that solely changing the price scheme is not considered a modification to the existing energy system of a facility. According, specific embodiments of the present invention can be used to compare different price schemes (by performing multiple Price Scheme Iterations) with or without modifying the existing energy system.

As illustrated at 106, that FRP may then be then published, depending on the embodiment and functionality desired and selected by the ESC tool's user, administrator and/or manager, preferably also listing each SACM, as described previously, together with the financial value of each and other economic, design/configuration and energy system performance information including, but not limited to, the results of other Price Scheme Iterations.

The subsequent description of the ESC tool first describes key aspects of the EM 102 and its various computations and information interchanges, and subsequently of the EOM 104 and its various computations and information interchanges. Subsequently, price scheme iterations and FRP publication, and financial performance are also discussed. In accordance with specific embodiments, the first Price Scheme Iteration computations are conducted using the fuel price scheme currently in force at the subject facility, and then other applicable price schemes are evaluated, in further Price Scheme Iterations, as directed by the ESC tool's user, administrator and/or manager.

Energy Model (EM) Functions

Figure 2:
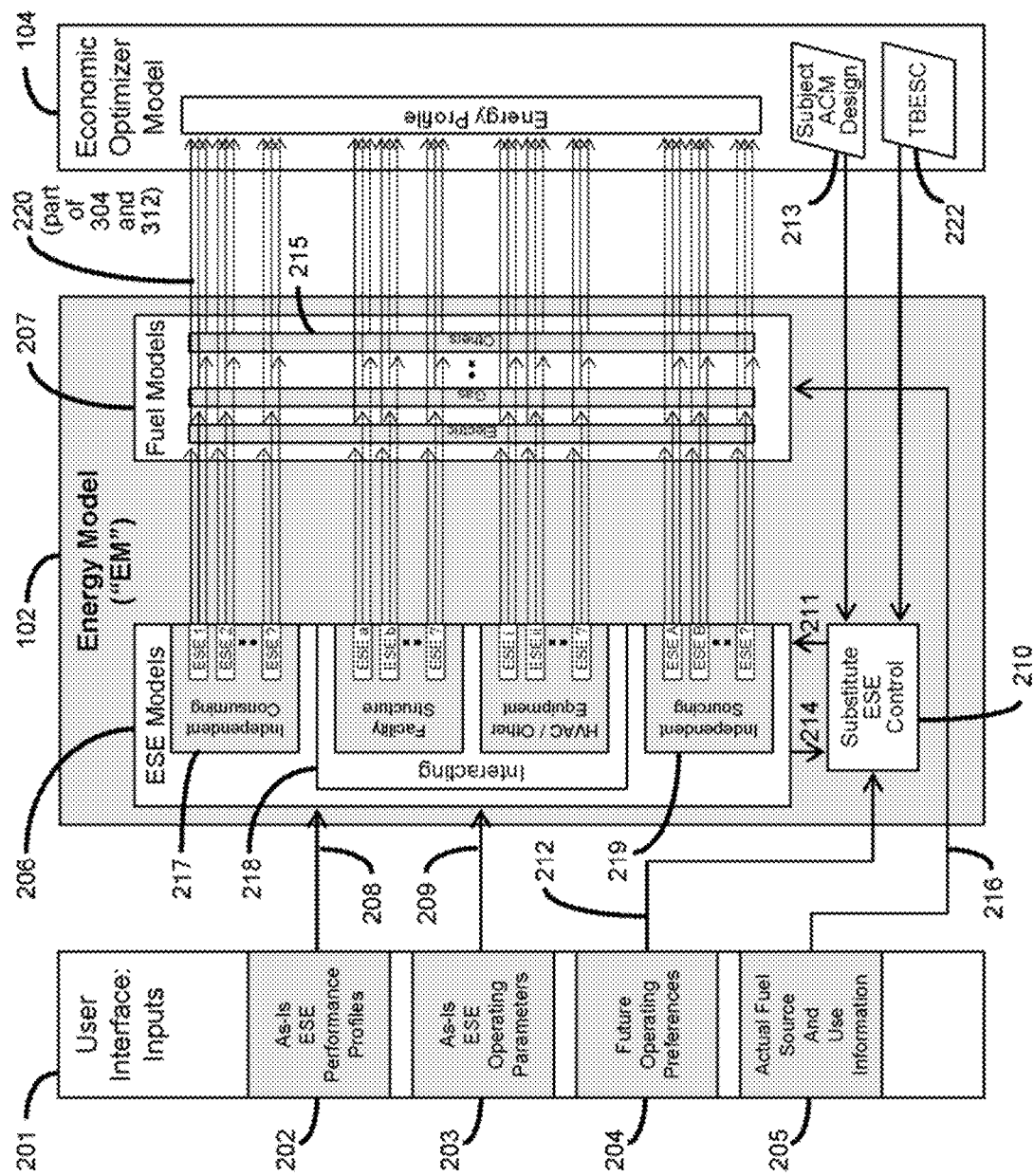
FIG. 2 is a block diagram that depicts additional details of the Energy Model (EM) introduced in FIG. 1, according to an embodiment of the present invention.

The EM 102 commences computations, for a particular fuel pricing scheme, as it receives information relating to the energy, fuel, ESE operating and other characteristics and factors at the subject facility, as set forth in FIG. 2. The information received by the EM 102 includes, but is not limited to: information from the ESC tool's user, administrator and/or manager, input via a User Interface 201 and/or otherwise; automated information collection from various databases on the world wide web, such as weather profile sources, appliance and equipment performance sources, real property information sources, fuel vendor sources; and other information sources, such as smart grid sources.

Figure 7:
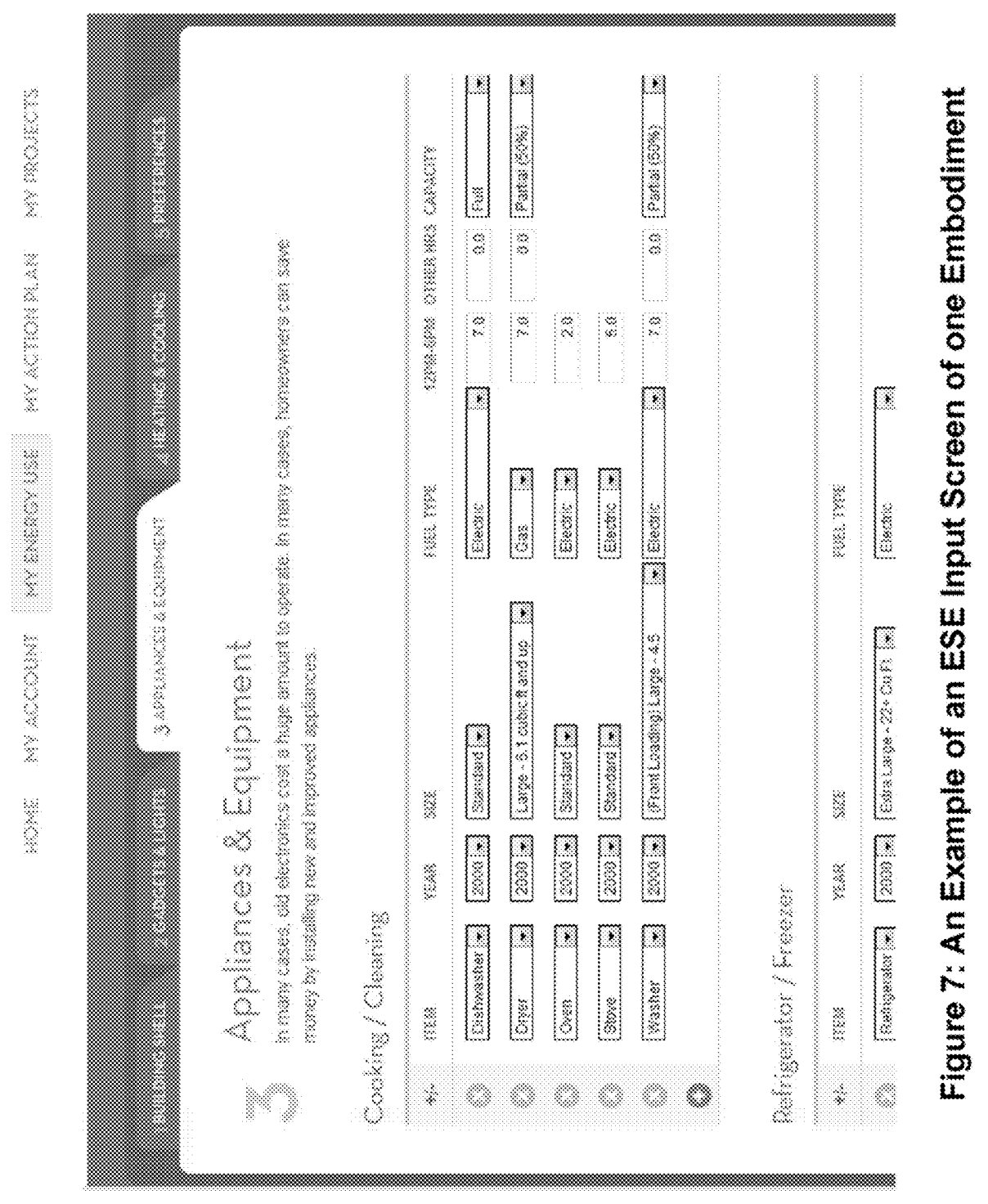
Figure 8:
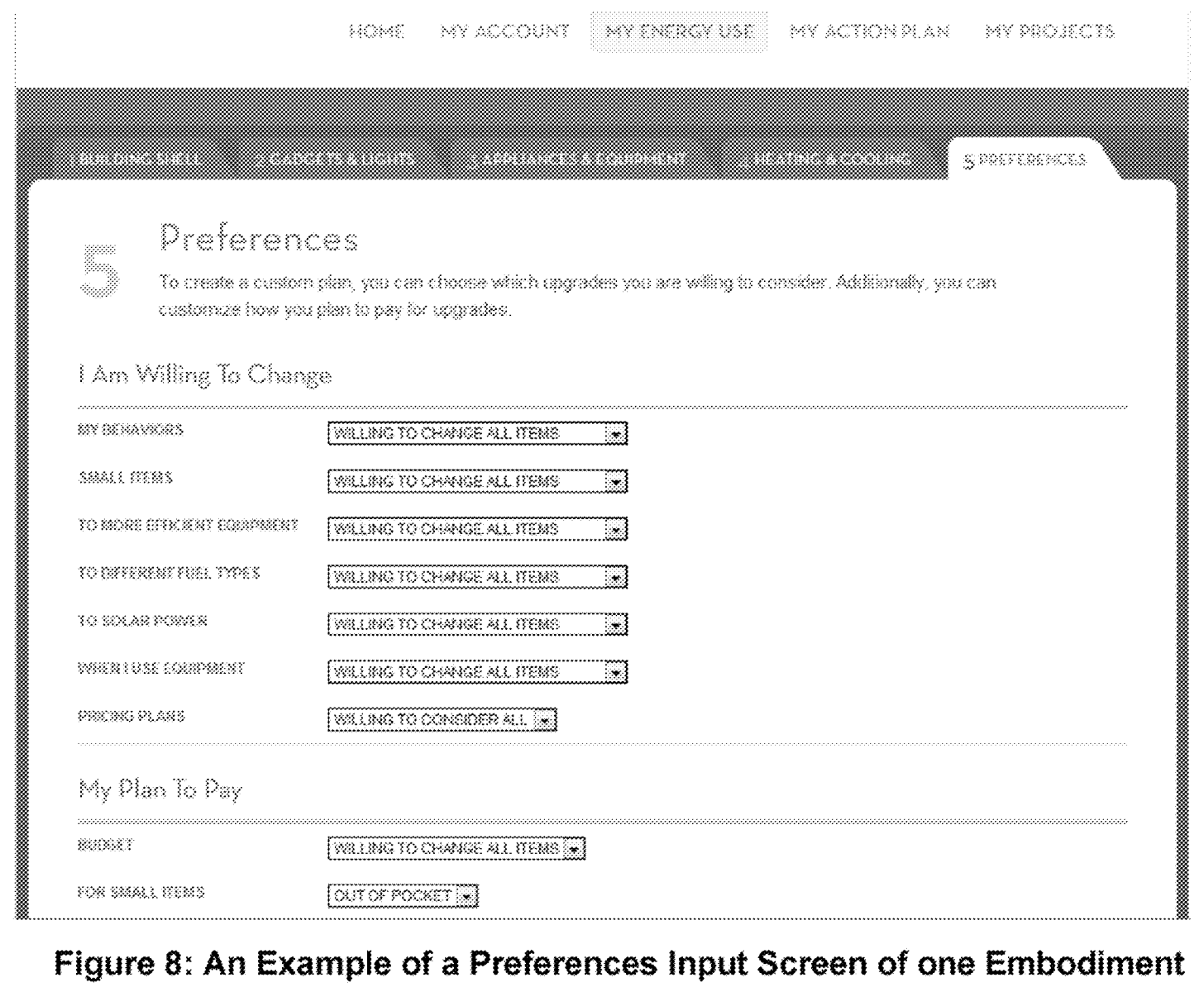

User Interface: Several groups of information are collected via the User Interface 201 by the EM 102 for use in its computations including, but not limited to: As-Is ESE Performance Profiles; As-Is ESE Operating Parameters; Future Operating Preferences; and Actual Fuel Source and Use Information, each of which is discussed below. The user interface 201 can include, e.g., a display, a keypad, a touch screen, mechanical buttons, one or more peripheral pointing devices (e.g., a mouse, touchpad, joystick, trackball, etc.), and/or the like. The user interface can include a graphical user interface (GUI) to facilitate interaction with a user, administrator and/or manager. Alternative types of user interfaces may also be used. FIGS. 7-9, which are briefly discussed below, illustrate exemplary information (e.g., screen shots) that can be accessed and displayed via the user interface 201. Such information can be accessed and displayed, e.g., using a mobile device, a desktop computer, a netbook, a laptop computer, a smart phone, an energy display device, a tablet computer, and/or similar devices. The user interface 201 may allow information to be entered or selected, e.g., using a mechanical or touch key pad, one or more drop-down or pop-up menus, a list box, and/or similar mechanisms. Where a key pad is used, freeform text may be entered where appropriate.

As-Is ESE Performance Profiles: The group of information input to the ESC tool that is descriptive of the operating performance and fuel source and use characteristics of each ESE, perhaps including the interaction of the fuel source and use characteristics among those ESEs and the subject facility's energy system as a whole, for all or nearly all relevant fuel types, is referred to as an ESE Performance Profile. The information input to the User Interface 201, and from other sources, is descriptive of the fuel source and use characteristics of ESEs in current existence at the subject facility, prior to any changes, and is referred to collectively as the As-Is ESE Performance Profiles 202. The specific information collected depends on the ESE type, though the commonality of the information collected for ESEs is that it includes, directly or indirectly, a rate of fuel and/or energy source or use; such a rate can be used in conjunction with usage and operating information for the subject ESE to facilitate a computation of the fuel sourced or used by the ESE for a certain temporal period. Such information for an ESE may be directly input, such as the kW consumed by a swimming pool filter pump, or the information may be deduced or retrieved, as in the case where descriptive parameters are input for a dishwasher, such as its size and manufacturing date and/or its make and model, and the rate of fuel consumption is retrieved, perhaps on a per load basis, from information provided by the manufacturer or others and input to the ESC's User Interface 201. FIG. 7 illustrates an exemplary ESE information input screen of the User Interface 201, according to an embodiment of the present invention.

As-Is ESE Operating Parameters: The group of information input to the ESC tool that is descriptive of the usage and operating profile of an ESE, is referred to as the ESE Operating Parameters. The information input to the User Interface 201, and from other sources, is descriptive of the usage and operating profile of ESEs in current existence at the subject facility, prior to any changes, and is referred to collectively as the As-Is ESE Operating Parameters 203. Again, the specific information collected depends on the ESE type, though the commonality of the information collected for ESEs is that it includes, directly or indirectly, a characterization of how much the ESE is used and operated; such an operating profile may be used in conjunction with ESE Performance Profile information for the subject ESE to facilitate a computation of the fuels sourced or used by the ESE for a certain temporal period. ESE Operating Parameter information for an ESE may be simple in nature, such as the amount of time a swimming pool filter pump is operated across various pricing periods over the course of a day; or the information may be complex, such as the times drapes are drawn over windows and the amount and nature of the sunlight that strikes them.

Future Operating Preferences: The group of information input to the ESC tool, which is referred to as Future Operating Preferences 204, is descriptive of the subject facility operator's: (a) willingness/unwillingness to undertake certain usage, operating, energy system performance, ESE and ESE interaction changes; and/or (b) financing preferences (including debt terms, opportunity cost terms, and others), should a reconfiguration be undertaken at the subject facility that necessitates some monetary outlay; among other factors. Changes in how an energy system and related ESEs are operated have the potential to be economically beneficial to a facility's operator, and may result from such factors as reduced fuel consumption by an ESE, reduced costs of fuel consumed by an ESE, increased fuel or energy production by an ESE and increased income from fuel produced by an ESE, among other factors. The usage, operating and design/configuration preference information collected depends on the subject facility's existing energy system design/configuration and/or each ESE type and can include, but is not limited to, the subject facility operator's willingness to: (a) alter the amount of time or the time period an ESE is operating, for example by shutting off lights in parts of a facility that are not in use; (b) alter the rate or capacity utilization at which an ESE is operated, for example increasing the capacity utilization of a clothes dryer; (c) adjust, replace or install an ESE, which has non-energy related considerations, such as the aesthetics of a dishwasher in a designer kitchen; (d) alter the pricing, pricing structure, or billing arrangements, as in the circumstance where several usage meters or billing accounts each with their own pricing structures are allowable at the subject facility, under which one or more ESEs is/are operated, such as changing the supplier of propane gas which used by a furnace heater; (e) alter the ESEs in operation, such as moving an air conditioner such as to reduce its cooling line length (and hence improve its energy efficiency); (f) alter the financing arrangements under which an ESE is in use; and/or other factors. Future Operating Preferences may be used by the EM 102 and EOM 104 to eliminate, add, bundle, prioritize or adjust the ACMs that are considered for implementation and inclusion in the FRP developed. FIG. 8 illustrates an exemplary future operating preferences input screen of the User Interface 201, according to an embodiment of the present invention.

Actual Fuel Source and Use Information: The group of information input to the ESC tool referred to as Actual Fuel Source and Use Information 205 is descriptive of the subject facility's fuel source and use, for each fuel, over time and the price structure each fuel is subject to. Among others techniques, this may be achieved by using historical fuel source and use and associated billing information, including smart grid data. In addition, other price structures that may be applied to the subject facility's energy system are also captured, computed and/or utilized as directed by the ESC tool's user, administrator and/or manager.

EM Computation Procedures and Processes: EM 102 computations are conducted in two phases, though these phases are not fully and exclusively sequential, and may overlap temporally or be simultaneous. The two phases include an As-Is Characterization Phase, and a To-Be Characterization Phase, each of which is discussed below.

As-Is Characterization Phase: In the first phase of EM 102 computations, within each Price Scheme Iteration, referred to as the As-Is Characterization Phase, the EM 102 conducts the computations of the ESE Models 206 and the Fuel Models 207 using the As-Is ESE Performance Profiles information 208 and As-Is ESE Operating Parameters information 209, together with other information and computations, collectively referred to as the As-Is Energy System Configuration (AIESC), as supplied user via the User Interface 201 and/or otherwise.

In the illustrative example, the AIESC may incorporate ESE Performance Profile and ESE Operating Parameter information on the seven ESEs at the facility, as exemplified simplistically by Table 1 below.

TABLE 1

| ESE | Performance Profile | Operating Parameter | Other Information |
| --- | --- | --- | --- |
| Lighting | 10 electric incandescent bulbs consuming at 0.1 kW | All bulbs are used 10 hours/month (the bill period) | No interaction with other ESEs |
| Dishwasher | 1, consuming (1.0 kWh + 1.0 therm [hot water])/load | Operated 1 load daily | No interaction with other ESEs |
| Clothes dryer | 1, consuming (0.1 kWh + 1.0 therm)/load | Operated 1 load daily | No interaction with other ESEs |
| Forced air furnace | 1, consuming (1.0 kWh + 100 therms)/month | Operated 30 days/month | Interacts with attic insulation |
| Air conditioner | 1, consuming 100 kWh/month | Operated 30 days/month | Interacts with attic insulation |

TABLE 1-continued

| ESE | Performance Profile | Operating Parameter | Other Information |
|---|---|---|---|
| Attic insulation | R1 per inch | 1 foot thickness covering all 1,000 feet$^2$ of house | Interacts with forced air furnace and air conditioner |
| Swimming Pool Filter Pump | 1, consuming 1 kW | Operated 6 hours daily | No interaction with other ESEs |

With these As-Is Characterization Phase computations the EM 102 compiles a profile of the energy and fuel characteristics of the subject facility's existing energy system and related ESEs, known as the As-Is Energy Profile (AIEP), which is passed (220 marks the transfer of one ESE's information, and relating to one fuel; part of the AIEP) to, and provides a base line for, the EOM 104 to use to develop its initial economic characterization of the AIESC, and then to use in its initial iteration of evaluations of ACMs in the To-Be Characterization Phase.

The AIEP includes a profile of preferably all of the fuels sourced and used by preferably all ESEs at the subject facility over a temporal period, and by the subject facility's energy system as a whole, based on the energy system in its current design/configuration, as described by the AIESC, and the pricing structure and pricing levels for those fuels over time, and other information.

In the illustrative example, the AIEP may include the following information on the seven ESEs at the facility, as illustrated in Table 2 below.

TABLE 2

| | Electricity | Natural Gas | Propane |
|---|---|---|---|
| Supplier/Vendor | American G&E | American G&E | Rogers |
| Price Structure | 10 c/kWh for first 50 kWh/mth 20 c/kWh for 2nd 50 kWh/mth 30 c/kWh for 3rd 50 kWh/mth 40 c/kWh for 4th 50 kWh/mth 50 c/kWh thereafter | $1/therm for first 10 therms/mth $2/therm thereafter | $1/gallon |

| ESE | kWh | therms | gallons |
|---|---|---|---|
| Lighting | 10.0 | 0.0 | 0.0 |
| Dishwasher | 30.0 | 30.0 | 0.0 |
| Clothes dryer | 3.0 | 30.0 | 0.0 |
| Forced air furnace | 1.0 | 100.0 | 0.0 |
| Air conditioner | 100.0 | 0.0 | 0.0 |
| Pool Filter Pump | 180.0 | 0.0 | 0.0 |
| Total | 324.0 | 160.0 | 0.0 |
| Attic insulation | 10.0 | 10.0 | 0.0 |

The information above in Table 2 relates to one month of the facility's operation, one billing period for all fuels in this example. However, in an actual application, subsequent perhaps more granular computations in the EOM 104 may require this information on an hourly or other granular basis for proper consideration of certain pricing structures, perhaps summed over monthly billing cycle, perhaps annualized to capture the characteristics of seasonal variations. Again, such level of detail may be computed based on inferences and assumed behavioral patterns, perhaps based on norms and averages, or directly and specifically input.

To-Be Characterization Phase: In the second phase of EM 102 computations, referred to as the To-Be Characterization Phase, within each Price Scheme Iteration, the EM 102 conducts new computations of the ESE Models 206 and Fuel Models 207, which are conducted based on information contained within each ACM Design, passed to the EM 102 by, and under the control of, the EOM 104.

The information that may be included in an ACM Design is often a new and/or a replacement Performance Profile and/or Operating Parameters of one or more of the subject facility's ESEs. For example, in an ACM where an appropriately selected replacement for an existing ESE is under consideration, such as the replacement of a heating furnace, the ESE Performance Profile of that replacement is the key component of the information that is sent; or, in the case where the subject ACM Design calls for the subject ESE to be operated differently, such as reducing the threshold temperatures that a heating furnace is programmed to hold the facility's climate to, the new ESE Operating Parameters are the key component of the information that is sent to the EM 102.

Within each ACM Iteration computation, the EM's ESE Models 206 and Fuel Models 207 computations utilize the new ESE Performance Profiles and ESE Operating Parameters, set in accordance with the specifications of the ACM Design under current consideration, to determine the ACM's energy profile; the fuel source and use characteristics of the subject facility's energy system were it to be adjusted to incorporate those new ESE Performance Profiles and ESE Operating Parameters. The EM 102 subsequently passes to the EOM 104 these fuel source and use characteristics of ESEs as they would be under that ACM Design.

To-Be Characterization Phase computations are conducted in a structured, iterative manner. In the first FRP Iteration, the EOM 104 passes the EM 102 one ACM Design, known as a Subject ACM Design 213, which the EM 102 uses to compute a Subject ACM Energy Profile (of which 220 is one element), the fuel source and use characteristics of the subject facility were the Subject ACM Design 213 to be implemented at the subject facility.

The Subject ACM Energy Profile (of which 220 is one element) may comprise a profile of all or nearly all fuels sourced and used by ESEs at the subject facility over time and for relevant temporal periods, and by the subject facility's energy system as a whole, based on a design/configuration of the subject facility's energy system that would exist were the changes described in the Subject ACM Design 213 to be actually implemented at the subject facility such as to alter the AIESC.

In the illustrative example, where a replacement swimming pool filter pump is under consideration in an ACM, a specific replacement device is included among the ACMs under consideration, possibly one of several replacement swimming pool filter pumps, and the Subject ACM Energy Profile (of which 220 is one element) is simply the AIEP less the reduction in electricity demanded, which was exemplified previously for one month as 108 kWh.

The Subject ACM Energy Profile (of which 220 is one element) is passed to the EOM 104 by the EM 102, and the EOM 104 uses it in a comparison with the AIEP in its computations to determine the ACM's financial performance; including financial benefit, financial attractiveness and financial value. The process continues with the EOM 104 passing, singularly and sequentially, the remaining ACM Designs it has listed to the EM 102, receiving back from the EM 102 a Subject ACM Energy Profile (of which 220 is one element) for each in each ACM Iteration.

ACM Iterations continue until the EOM 104 has exhausted its evaluations of the initial list of ACM Designs. At that juncture, the EOM 104 may halt the entire process if no ACM is found to have financial benefit. However, should one or more ACMs be found to have financial benefit, and therefore one ACM is selected for inclusion in the FRP, the SACM 1, then the EOM 104 commences the second FRP Iteration to determine the financial performance of any further ACMs based on a subject facility energy system design/configuration that would have been adjusted to incorporate the design/configuration alterations contemplated by the Subject ACM Design 213 selected by the EOM 104 as having the greatest financial attractiveness in the initial FRP Iteration, SACM 1.

In commencing the second FRP Iteration, the EOM 104 compiles the first To-Be Energy System Configuration (TBESC), as represented by data block 222. The first TBESC 222 is a characterization of the subject facility's energy system design/configuration as it would be after SACM 1 has been implemented at the subject facility; the first TBESC 222 is compiled by adjusting the AIESC to incorporate the design/configuration alterations contemplated by the Subject ACM Design 213 of the SACM 1.

The EM 102 uses the first TBESC 222 to compute the first To-Be Energy Profile (TBEP) (of which 220 is one element), an energy profile of the subject facility's energy system as it would be were the subject facility's energy system configured as set out in the first TBESC 222. This first TBEP (of which 220 is one element) comprises a profile of fuels sourced and used by ESEs at the subject facility over time, and by the subject facility's energy system as a whole. This first TBEP (of which 220 is one element) is passed to the EOM 104 for use in its second FRP Iteration computations as the baseline for the EOM 104 to compute the financial performance, including financial benefit, financial attractiveness and financial value, of each of the ACMs in the second list of ACM Designs, in a second set of ACM Iterations.

In our illustrative example, where the replacement swimming pool filter pump is the SACM 1, the AIESC modified to incorporate the replacement swimming pool filter pump's Subject ACM Design 213 becomes the TBESC 222, and its Subject ACM Energy Profile (of which 220 is one element) becomes the TBEP (of which 220 is one element) for the subsequent FRP Iteration.

As previously, in the second set of ACM Iterations, of the second FRP Iteration, the EOM 104 passes the EM 102 a second set of Subject ACM Designs, singularly and sequentially, which the EM 102 uses to compute a second set of Subject ACM Energy Profiles, each relating to the Subject ACM Designs they were based on. This time, each Subject ACM Energy Profile (of which 220 is one element) characterizes the energy system's energy profile, were the first TBESC 222 changed to reflect the subject facility's energy system design/configuration described in each respective Subject ACM Design 213.

Each Subject ACM Energy Profile (of which 220 is one element) is passed by the EM 102 to the EOM 104, and is used by the EOM 104 in a comparison with the first TBEP (of which 220 is one element) in its computations to determine whether each respective ACM has financial benefit, using the same methods described previously as for the first FRP Iteration. This second set of Subject ACM Energy Profiles (of which 220 is one element) each comprise a profile of fuels sourced and used by ESEs at the subject facility over time, and by the subject facility's energy system as a whole, based on a design/configuration of the subject facility's the energy system that would exist were the changes described in the respective Subject ACM Design 213 to be actually implemented at the subject facility to alter the first TBESC 222.

Once again, in each ACM Iteration, the EOM 104 passes, singularly and sequentially, the remaining ACM Designs it has on its list to the EM 102, receiving back from the EM 102 a Subject ACM Energy Profile (of which 220 is one element) for each. Once again, these ACM Iterations continue until the EOM 104 has exhausted its second list of ACM Designs. At that juncture, the EOM 104 may halt the entire process if no ACM is found to have financial benefit. However, should one or more ACMs be found to have financial benefit, and therefore another ACM is selected, the SACM 2, for inclusion in the FRP, and then the EOM 104 commences another FRP Iteration to determine whether any further ACMs have financial benefit.

Subsequently, further FRP Iterations are conducted each time the EOM 104 identifies one or more ACMs with financial benefit in the current FRP Iteration. This process of FRP Iterations continues until either all ACMs are selected for inclusion in the FRP, or until a FRP Iteration finds no further ACM has financial benefit. The TBESC 222 of each current FRP Iteration is adjusted to incorporate the design/configuration contemplated in the ACM Design of the SACM of the current FRP Iteration, the resulting TBESC 222 becoming the new TBESC 222 for the subsequent FRP Iteration. The Subject ACM Energy Profile (of which 220 is one element) of the SACM of that current FRP Iteration becomes the TBEP (of which 220 is one element) for the subsequent FRP Iteration.

EM Models

Principally, the EM 102 undertakes two sets of computation within each phase. One set of computations, the ESE Models 206, compute the fuel source and use characteristics of existing and prospective ESEs in the subject facility's energy system.

Many factors contribute to the complexity of the computations required to developing plans to reconfigure a facility's energy system to deliver maximized or near maximized financial performance toward a financial objective including, but not limited to:

1. Unique facility energy system configuration: Most facilities possess a unique energy system, each with its own ESEs, which are configured in a unique fashion.
2. Unique facility energy operation: Most facility operators employ a unique set of parameters for operating their facility's energy system.
3. Factors change with time: Conditions that exist at one time are likely, and expected, to change with the progression of time. To a large degree, with the facility fuel source and use subject to lengthy appliance and equipment lives, lengthy appliance and equipment development cycles, lengthy regulatory processes and other factors, most changes are predictable within the acceptable tolerance of making economically based decisions, such as changes in energy system operating profiles, equipment performance and other factors.

Facility Energy System Configuration: An accurate and dynamic characterization of the various fuel sources and uses, and energy flows, for a facility's energy system is an important component to computing how energy systems and their operations are best adjusted and reconfigured to maximize or near maximize financial performance toward a financial objective. However, prior approaches to characterize and reconfigure energy systems are not able to develop optimized plans of action that lead to a maximized or near maximized financial performance toward a financial objective as they lack the scope needed (such as the ability to simultaneously consider many fuels, or many types of ACMs and/or ESEs such as both sourcing and using ESEs), they lack the ability to deal with complexity and the associated accuracy needed (such as the interaction between different types of ACMs and ESEs in economic oriented computations that require numerous adjustments to the baseline energy system design/configuration as each SACM is selected for inclusion in an FRP), and other factors. Consequently, the ESE Models 206 computations comprise new methods, procedures and outputs in its profiling of a facility's existing and prospective energy system to facilitate the EOM's own unique optimization computations.

Facility Energy System Fuel Source and Use: A characterization of fuel source and use at a subject facility's energy system based primarily on theoretical computations, such as those commonly used to estimate the correct size, capacity and loading capabilities of HVAC and other equipment, with little or no consideration of actual fuel consumption at the facility, is highly likely to result in significant errors when computing energy system's economics as they relate to a particular facility operator, and their use of those energy systems. A useful embodiment of the present invention is its ability to characterize a facility's energy system based on its actual fuel sources and uses. An embodiment of the present invention uses a facility's energy system's actual fuel sources and uses information to allocate fuel source and use amounts to components of that energy system. This may be done by using some of the theoretical techniques commonly used as cited previously, such as those to estimate an ESE's correct size, capacity and loading capabilities, as a consideration in allocating actual fuel source and use information, such as historical fuel source and use information aggregated at the whole facility level. Such techniques result in a characterization of the facility's energy system that is much more accurate than approaches that do not incorporate such actual aggregated fuel source and use information. Here too, the present invention includes, within the Fuel Models new methods, procedures and outputs in its profiling of a facility's energy sources and uses to facilitate its unique economic and financial optimization functions, and reflecting the facility operator's actual operating profile and associated economics.

Changes Over Time: The EM 102 includes many new methods, procedures and outputs to facilitate its unique economic and financial optimization functions; incorporating temporal factors that are integrated across all or nearly all ESEs in a facility's energy system, in a dynamic computation that addresses technical, price, operating and other considerations that change with time. Such temporal factors include, but are not limited to, collecting and utilizing in computations information from the ESE tool's user, administrator and/or manager, and other sources including; (a) ESE Performance Profile information that vary over time; (b) ESE Operating Parameters information that vary over time; (c) user Future Operating Preference information that vary over time; and (d) fuel price and usage information that vary over time; among other factors.

ESE Models: ESE Models 206 perform computations, which are referred to as ESE Models computations, of which there are several classes. Within each class, each type of ESE, such as a dishwasher, has its own specific energy computation formulae, systems and methods. One class, referred to as the Independent Consuming Equipment class, relates to appliances and equipment that consume energy and/or fuel to fulfill a function in the subject facility, and have little or no energy and/or fuel related interaction with other ESEs. Another class, referred to as the Interacting class, relates to appliances and equipment where the energy and/or fuel source and use is highly interrelated among the appliances and equipment in the subject facility. A further class, referred to as the Independent Sourcing Equipment class, relates to appliances and equipment that supply energy and/or fuel to fulfill a function in the subject facility, and have little or no energy and/or fuel related interaction with other ESEs.

Independent Consuming Equipment ESE Models: Independent Consuming Equipment ESE Models, generally represented by block 217 in FIG. 2, perform computations that are largely independent and relate to specific net energy and/or fuel consuming ESEs deemed as having negligible or no energy related interaction with other ESEs. Such an ESE may be, e.g., an outside porch light or an occasionally used small radio; although each of these items may emit some amount of heat or other energy when operated, any amounts emitted may be deemed to be unrelated to, or too trivial to have a material impact on other ESEs, such as the subject facility's climate control equipment in cases where heat is emitted.

Interacting ESE Models: Interacting ESE Models, generally represented by block 218 in FIG. 2, perform computations that relate to ESEs that, should their performance profiles or operating parameters be changed, perhaps through equipment replacement or some other measure, then the energy and/or fuel characteristics of other ESEs would also be changed, perhaps rendering a course of action that would be different were the computations be done in isolation; individually and separately. For example, such an interaction of energy and/or fuel characteristics may exist between an ESE such as a heating furnace in a facility, and an ESE such as attic insulation in the same facility. If the energy and/or fuel characteristics of these ESEs are computed in isolation, and without regard to one or the other being implemented at the subject facility, the result may be that computations would report an upgrade to or replacement of both ESEs would be economically beneficial. However, the energy and/or fuel characteristics and performance of such ESEs in most facilities are in actuality, interdependent, such that an increase in attic thermal insulation may reduce heat loss from the subject facility sufficiently to render an upgrade to a more energy efficient heating furnace to not be economically beneficial. Therefore, Interacting ESE Models computations include integrated interrelated ESE energy computations, where the changes in an ESE's energy and/or fuel characteristics resulting from a selection by the EOM 104 of a SACM are used to adjust the energy and/or fuel characteristics and performance of other ESEs in that integrated system.

Independent Sourcing Equipment ESE Models: Independent Sourcing Equipment ESE Models, generally represented by block 219 in FIG. 2, perform computations that are largely independent and relate to specific net energy and/or fuel producing ESEs deemed as having negligible or no energy and/or fuel related interaction with other ESEs. For example, ground mounted photovoltaic solar panels installed to generate electricity may be deemed to have negligible or no energy and/or fuel related interaction with other ESEs.

Notably, ESE Models computations may be conducted in an incremental manner; should an ESE have flexibility in its source and/or use capacity, the EOM 104 may incorporate iterative incremental computational capabilities to evaluate financial performance, including financial benefit, financial attractiveness and financial value, of such ESEs in increments of the smallest capacity component of each of the flexible capacity ESEs, and use such capabilities to compute energy and/or fuel profile information for such ACMs incrementally. As such, when evaluating ACMs with such ESEs, referred to as Variable ACMs, the EOM 104 determines an ESE capacity that presents the maximized or near maximized financial performance as it conducts these iterative capacity sizing computations. An example of such an ACM where incremental computations may be used by the EOM 104 to determine the ESE capacity with maximized or near maximized financial performance is in the implementation of a photovoltaic solar panel generating system at a facility. In such a case, the EOM 104 evaluates the financial performance of such systems with varying numbers of individual photovoltaic solar panels to determine that number of panels (and hence electricity generating capacity) with the financial benefit, if any, and the greatest financial attractiveness, as described subsequently.

The EM 102 has as a Substitute ESE Controller 210, which sets ESE Performance Profiles and ESE Operating Parameters in the ESE Models 206, as indicated by arrow 211, in accordance with each ACM Design specifications. For example, in the illustrative example in a facility where a swimming pool filter pump is operated, one ACM Design that may be evaluated by the EOM 104 to compare existing energy system economics with future potential energy system economics, would be the replacement of that swimming pool filter pump with an alternative that consumes less electricity (as such, the ACM Design would require an alternative ESE Performance Profile), together with an alteration in the way the swimming pool filter pump is operated (as such, the ACM Design would also require alternative ESE Operating Parameters).

Information (e.g., data) passed from the ESE Models 206 to the Substitute ESE Controller 210 is generally represented by arrow 214; and information (e.g., data) passed from the Substitute ESE Controller 210 to the ESE Models 206 is generally represented by arrow 211. The setting of new ESE Performance Profiles and ESE Operating Parameters is executed by the Substitute ESE Controller 210, and may be based on certain factors including, but not limited to, input Future Operating Preferences (represented by block 204), EOM 104 evaluation computation needs as specified by Subject ACM Designs (represented by data block 213) and the TBESC 222 passed to the EM 102 at the current evaluation juncture of the EOM 104, the availability of ESEs with alternative ESE Performance Profiles, and the suitability of alternative ESE Performance Profiles and ESE Operating Parameters for the subject facility's operation. Such suitability may take into account such factors as, but not limited to, a potential replacement ESE's performance required to replicate the performance of the existing ESE or for the subject facility's required and/or desired operation, its ability to increase fuel supply or reduce fuel use, or improve the energy system's financial performance in some other way, among other factors.

Fuel Models: The EM 102 has Fuel Models 207 used to perform fuel model computations; a set of computations that determine the fuel source and use of each existing or prospective ESE and the subject facility's energy system as a whole, subtotaled for relevant temporal periods as appropriate.

Each fuel sourced and/or used at the subject facility and set as to be included in computations, subject to its own pricing structure, may have its own fuel model (such as that identified by 215 in FIG. 2). This may include, but is not limited to, electricity, natural gas, propane gas, fuel oil, combustible wood and others. Each fuel model is provided with actual and/or estimated fuel source and use information for the subject facility 216, subtotaled for relevant temporal periods as appropriate, together with price structure and price level information.

Each fuel model receives fuel source and use information relating to ESEs, and the energy system as a whole, at the subject facility from the ESE Models 206, including subtotals for relevant temporal periods as appropriate. This information is used to compute and compile a record of sources and uses of fuels for each ESE addressed, also subtotaled for relevant temporal periods as appropriate.

Each fuel model may evaluate whether the information provided has integrity, perhaps including, but not limited to: that fuel source and use information for each ESE is within sensible limits; that totals of ESE fuel source and use computations are consistent with energy system and actual fuel source and use totals for the subject facility as a whole; and other integrity evaluations.

In situations where an information integrity evaluation determines that information contained in such record is lacking in integrity in some fashion, the information integrity evaluation may report such lacking for corrective or other action as appropriate. In situations where this information integrity evaluation determines there are no, or are only minor, information integrity discrepancies, within the boundaries of certain information integrity tolerance limits, the fuel model may make adjustments to ESE fuel source and use information automatically to ensure integrity in subsequent computations.

Each fuel model subsequently reports ESE fuel source and use information, for relevant temporal periods as appropriate, for ESEs addressed in the subject facility to the EOM 104. This is done for both the existing energy system design/configuration at the subject facility in the As-Is Configuration Phase of EM 102 computations, and for each ACM Design evaluation (in each ACM Iteration) in the To-Be Configuration Phase of EM 102 computations, as key components of the AIEP and the TBEP, respectively.

Economic Optimization Model (EOM) Functions

In accordance with embodiments of the present invention, the Economic Optimization Model (EOM) 104 has solutions to inhibitors that heretofore have prevented facility operators from successfully planning and undertaking actions to reconfigure their energy system in a way that maximizes or near maximizes financial performance toward a financial objective. A principal inhibitor to such reconfiguration action is the very high number of complex considerations that need to be included in energy system reconfiguration planning optimization; a result of there being very many factors to consider, each possessing a high degree of complexity, and with many interdependencies among the factors.

In accordance with embodiments of the present invention, the EOM 104 performs an Energy System Economic Optimization Algorithm (ESEOA) that properly delineates, sequences and manipulates relevant factors and information in a highly structured fashion, to develop plans properly optimized for a chosen financial objective. The ESEOA appropriately addresses these and other factors in a rational and systematic method, delivering a simple solution; a specific and distilled plan of action for the reconfiguration of a facility's energy system. Many factors contribute to the complexity of the computations required to developing plans to reconfigure a facility's energy system to deliver maximized or near maximized financial performance toward a financial objective including, but not limited to, the following:

1. Complex incentives structures: Various organizations attempt to influence facility operators to have them adjust the energy system ESE profile and operating parameters of their respective facilities; the mechanisms used to affect that influence include the enactment of laws, regulations and financial incentives, among other mechanisms. Financial incentives include, but are not limited to; tax incentives of many types, including tax credits; grants; equipment purchase rebates; demand response incentives; fuel savings incentives; equipment disposal incentives; among others.
2. Complex fuel pricing structures: An instrument that is increasingly manipulated to influence the energy demand of facility operators is in the mandated adjustment of the structure and level of fuel prices. In particular, fuels are increasingly subject to a Tiered Pricing Structure (TPS) of one form or another.
3. Factors change with time: Conditions that exist at one time are likely, and expected, to change with the progression of time. To a large degree, with the facility fuel source and use subject to lengthy appliance and equipment lives, lengthy appliance and equipment development cycles, lengthy regulatory processes and other factors, most changes are predictable within the acceptable tolerance of making economically based decisions, such as changes in fuel prices, financing and other factors.

Incentive Structures: Specific embodiments of the present invention go far beyond simply presenting the existence and availability of financial and other incentives, or simply including them in computations of the economics of a particular facility reconfiguration or operating change, instead using those financial and other incentives and any associated mandates within an integrated computation to develop plans to reconfigure the energy system of existing facilities in a fashion that delivers the maximized or near maximized financial performance toward a financial objective. Among other features, these financial and other incentives and associated mandates are allocated to the optimal or near optimal ACMs, depending on the financial objective, and adjusted in terms of subsequent availability as appropriate. Here too, embodiments of the present invention, and the ESEOA in particular, includes many new procedures and outputs to facilitate its unique optimization functions.

Tiered Pricing Structures (TPS): In its typical implementation, a tiered pricing structure (TPS) is used by vendors in certain markets as a method to reward customers with reducing levels of pricing for increased volumes of product and/or service purchasing, in an effort by the vendor to encourage prospect customers to purchase larger volumes of the product and/or service. Products and/or service offered for sale in markets with a normal TPS are priced at a specified monetary amount per unit, or level, up to certain initial threshold volume of demanded product and/or service within a specified time period or some other metric; volumes of product and/or service demanded by that same customer in excess of that initial threshold volume are subject to a lower specified monetary amount per unit, or level, up to a second threshold volume; further volumes of product and/or service demanded by that same customer in excess of that second threshold volume are subject to an even lower specified monetary amount per unit, or level, up to a third threshold volume; and further volumes demanded are subject to lower specified monetary amounts per unit as each sequential threshold of demanded volumes are exceeded. The number of thresholds and associated price levels may vary infinitely, except that they must exceed zero in number, and the structure of the pricing at each level may itself follow some additional structure and method.

Conversely, some markets operate with vendors offering product and/or service subject to a Reverse Tiered Pricing Structure (RTPS) wherein vendors attempt to use increasingly higher levels of pricing to discourage prospective customers from purchasing larger volumes of the product and/or service they are offering. As the term/phrase is used herein, an RTPS is a specific type of TPS. An illustration of the operation of an RTPS is presented by abbreviated example in FIG. 5. In markets with RTPSs, products and/or services have marginal prices at a specified monetary amount per unit (Price 1 in FIG. 5) for volumes up to certain initial threshold volume of product and/or service within a specified time period (volumes from none to Amount 1 in FIG. 5) or some other metric; volumes of product and/or service for that same customer in excess of that initial threshold volume are subject to a higher specified monetary amount per unit (Price 2 in FIG. 5) up to a second threshold volume (volumes between Amount 1 and Amount 2 in FIG. 5); further volumes of product and/or service for that same customer in excess of that second threshold volume are subject to an even higher specified monetary amount per unit (Price 3 in FIG. 5) up to a third threshold volume (volumes between Amount 2 and Amount 3 in FIG. 5); and further volumes of product and/or service are subject to higher specified monetary amounts per unit as each sequential threshold of volumes are exceeded. Again, the number of thresholds and associated price rates may vary infinitely, except that they must exceed zero in number, and the structure of the pricing at each level or volume or other metric may itself follow some additional structure and method; some of which are described subsequently.

RTPSs are increasingly being adopted by utility and other fuel vendors, perhaps where policy makers and supervising market regulators are encouraging and/or mandating the use of RTPSs in an attempt to attenuate consumer demand for utility supplied and other fuels.

RTPSs may be implemented in several variants including, but not limited to: (a) the Standard RTPS, where the volumes of fuel within each threshold delineator, each volume subject to a corresponding price, are specified over a certain temporal period, known as a Billing Period, such as a month; and (b) the Time Of Use RTPS (TOU RTPS), where several RTPSs are applied within a Billing Period.

A common application of the TOU RTPS is the Daily TOU RTPS, where several RTPSs are in force over the course of a day, each applied to specific time periods across a day's 24 hours. The volumes of fuel sourced or used within each threshold delineator are grouped and summed over a Billing Period, such as a month, and their corresponding prices are applied. For example, under this RTPS scheme, one RTPS may be in force during periods of very high demand within a day, such as during afternoon hours for electricity, while other RTPSs are in force at other specified time periods during the day (e.g., off-peak demand periods).

A common application of the Daily TOU RTPS is the Weekly Daily RTPS, where each day in a week possesses its own set of Daily TOU RTPSs. For example, under one Daily TOU RTPS scheme, one set of RTPSs may be in force for Monday to Friday, inclusive, while another set of Daily TOU RTPSs are in force for Saturday and Sunday.

A common application of the Weekly Daily RTPS is the Seasonal Weekly Daily RTPS, where each season possesses its own set of Weekly Daily RTPSs. For example, under this RTPS scheme, one set of Weekly Daily RTPSs may be in force for the summer, while another set of Weekly Daily RTPSs may be in force for the winter.

Here too, an embodiment of the present invention, and the ESEOA in particular, includes many novel procedures and outputs to facilitate its unique optimization functions. Note that references as to how the ESEOA and other ESC tool elements, components and parts deal with, process, compute or interact in any way with RTPSs, applies equally with how they do same with their variants, normal TPSs, their variants and hybrid combinations of all or nearly all schemes.

The ESEOA assists customers that demand products and/or services subject to RTPSs make economically optimal system design/configuration and purchasing decisions. Such customers are likely to need to use the ESEOA in circumstances where their demand for the products and/or services is resultant from the use of complex systems comprising multiple and differing elements, each with complex cost and other factors.

Such a condition typically exists in the case of an energy system present at a facility, where that energy system comprises multiple fuel consuming elements, such as the ESEs presented herein, of multiple types, differing specifications and differing operating approaches, each sourcing and/or using fuels of multiple types. Over time, increasing numbers of facilities are subject to RTPSs. Since those differing ESEs may source and use fuels of different types and at differing rates, and fulfill differing tasks, and each having the potential to be reconfigured in differing ways, each potentially with their own cost to affect such reconfigurations, the computations of the ESEOA to define an optimal reconfiguration and the actions needed to implement them are highly structured, rational, extensive and preferably exhaustive and preferably based on the actual fuel source and use, and energy system design/configuration information. Again, the ESEOA includes many new procedures and outputs to facilitate its unique optimization functions.

While the ESEOA's processes are presented herein in terms of maximizing or near maximizing the financial benefit of the energy system at a facility, the methods and processes are applicable to other circumstances where products are perhaps subject to differing price schemes and perhaps driven by complex systems comprising multiple and differing elements, perhaps each with complex cost and other factors, and in need of some optimization of one kind or another.

Changes Over Time: The ESEOA includes many new procedures and outputs to facilitate its unique optimization functions, incorporating temporal factors that are integrated across ESEs in a facility's energy system, in a dynamic computation that considers technical, economic, financial and other considerations. Such temporal factors provide added detail relating to such considerations including, but not limited to, collecting and utilizing in computations information from the ESE tool's user, administrator and/or manager, and other sources; (a) fuel price change information over relevant temporal periods; (b) implementation cost information over relevant temporal periods, including that of financing; and other information.

Figure 3:
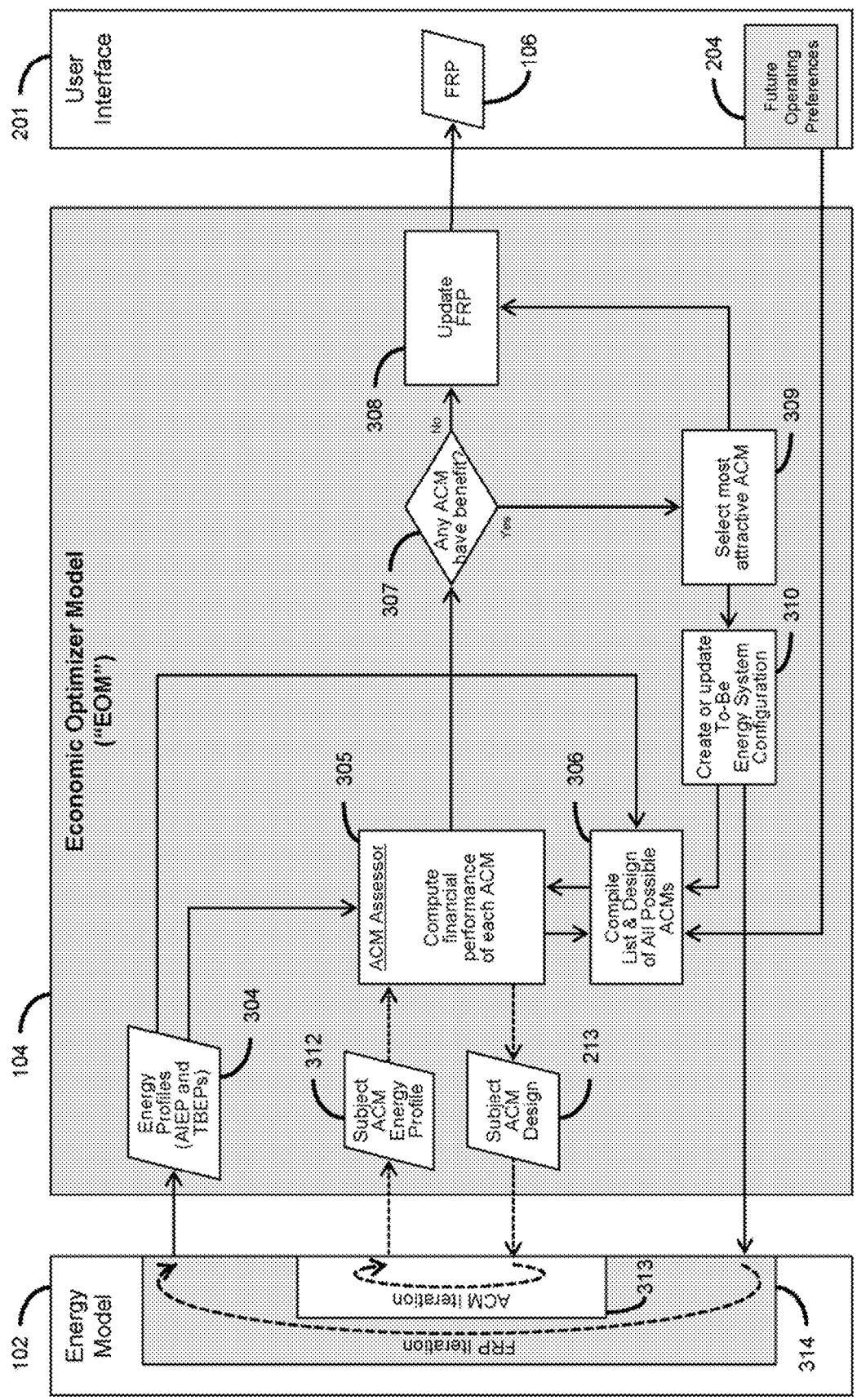
FIG. 3 is a block diagram and flow diagram that depicts additional details of the Economic Optimizer Model (EOM) introduced in FIG. 1, according to an embodiment of the present invention.

ESEOA Computation Procedures and Processes: FIG. 3 sets out the key component functions of the EOM 104, adjacent functions, and the ESEOA as it operates within the ESC tool. The EOM 104 receives from the EM 102 a significant amount of the information needed by the ESEOA to conduct its computations. The EOM 104, in turn, provides information to the EM 102 for certain incremental computations, as needed and described herein, to compile an FRP 308. The computations conducted by the ESEOA are principally economic and iterative in nature, oriented around developing and using financial performance information toward a financial objective; while financial performance information is described in the paragraphs following immediately as may be applied in accordance with an embodiment and/or exemplified in one form or another, a more full description of financial performance is described separately and subsequently. In accordance with an embodiment, once the ESEOA has exhausted the computations needed to compile the current FRP, that FRP is compared with other FRPs compiled by the computations of any other Price Scheme Iterations conducted; one may be subsequently selected, as described herein, and that selected FRP may be passed (as indicated by 106) to the User Interface 201, preferably for publication along with other information.

As-Is Characterization Phase: In the As-Is Characterization Phase of EOM 104 computations, the EOM 104 compiles a profile of the energy economics of the subject facility's existing energy system, which it utilizes as a base line upon which it conducts initial evaluations within a Price Scheme Iteration and other evaluations.

The ESEOA starts its computations when an initial energy profile 304 of energy sources and uses of the subject facility, the AIEP 304, is passed by the EM 102 to an ACM Assessor 305. This energy profile may include a profile of fuels sourced and used by ESEs at the subject facility over time, and by the subject facility's energy system as a whole, based on the energy system in its current actual design/configuration, as described by the AIESC, and the pricing structure and pricing levels for each fuel over time, and other information.

The nature of temporal information contained in the various energy profiles 304 used by the ESEOA in its computations includes multiple elements of information addressing time periods of sufficient granularity to needed to capture and characterize relevant fuel and energy source and use patterns; such as seasonal changes from month to month across the year, that are relevant for characterizing such factors as heating system energy flows at the subject facility; and daily and seasonal fluctuations from hour to hour and week to week, that are relevant for characterizing such factors as electricity production of photovoltaic solar panel installations, and for evaluating the energy systems economics under RTPS schemes that are oriented around fractions of a day, as needed.

Figure 4:
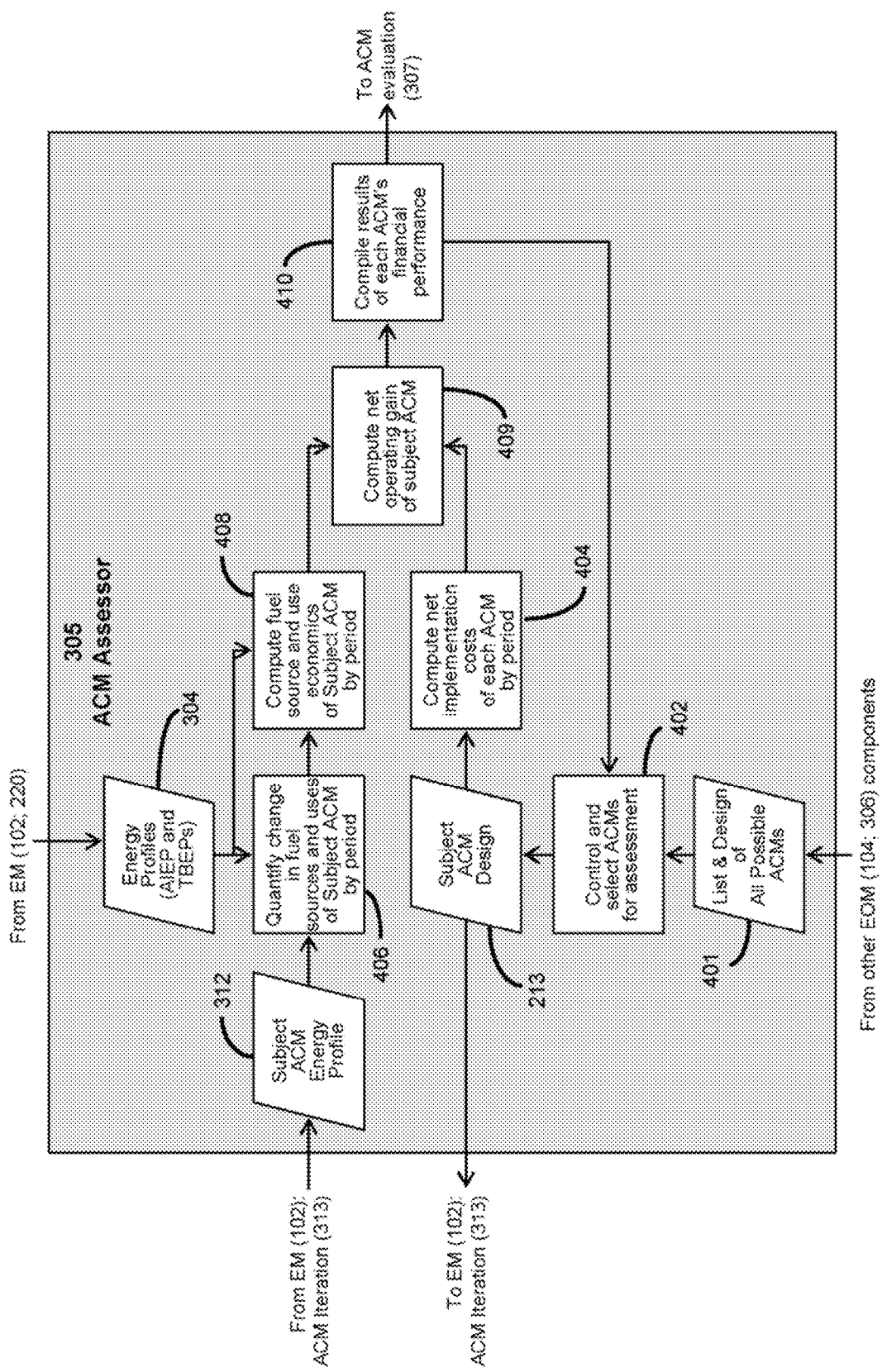
FIG. 4 is a block diagram and flow diagram that depicts additional details of the Alternative Configuration Measure (ACM) Assessor introduced in FIG. 3, according to an embodiment of the present invention.

The ACM Assessor 305 computes the financial performance toward a financial objective of ACMs when considered in comparison with a certain energy system design/configuration. The process and function of the ACM Assessor 305 are depicted in FIG. 4, which is described below.

The ACM Assessor 305 initially compiles an economic characterization of the subject facility's original existing design/configuration, the AIESC, for each Price Scheme Iteration. This serves as a baseline for subsequent computations within each Price Scheme Iteration.

To-Be Characterization Phase: The To-Be Characterization Phase of computations in the EOM 104 commences, within each Price Scheme Iteration, with the first FRP Iteration, with the development of a List & Design of All Possible ACMs, as indicated by process block 306 in FIG. 3. The initial energy profile of the subject facility, the AIEP 304, previously passed to the EOM 104, may be utilized in this process to compute and compile the first List & Design of All Possible ACMs, which is indicated by data block 401 in FIG. 4.

The process of compiling the List & Design of All Possible ACMs can include, but is not limited to, use of an initial list of applicable ACMs, compiled as described previously, that may be desirable for consideration for the subject facility, perhaps at various appropriate and/or specified junctures in the EOM's computation iterations. The process of compiling the List & Design of All Possible ACMs can also include applying the Future Operating Preferences information 204 collected via the User Interface 201, also compiled as described previously, and other sources, as described previously. Such information regarding the inclusion of ACMs include, but are not limited to, including and/or excluding ESEs and other energy system design/configurations at the subject facility, including and/or excluding and/or adjusting the ESE Performance Profiles of ESEs, including and/or excluding and/or adjusting the ESE Operating Parameters of ESEs, including and/or excluding and/or adjusting certain financing options, among other factors.

As indicated by process block 402, the ACM Assessor 305 controls which ACM is assessed, in turn, within each ACM Iteration. In the first FRP Iteration, the design of one selected ACM, the Subject ACM Design indicated by data block 213, is passed to the EM 102 for the EM 102 to compute the Subject ACM Energy Profile 312 of that Subject ACM Design 213. That component of each ACM Iteration conducted in the EM 102 is represented by block 313.

The Subject ACM Energy Profile 312 is subsequently passed by the EM 102 to the EOM 104 and the ESEOA, and used by the ACM Assessor 305 in a comparison with the AIEP 304 in its computations to determine that ACM's financial performance toward the financial objective, including its financial benefit, if any, its financial attractiveness, and its financial value, as appropriate. The Subject ACM Energy Profile 312 includes a profile of the fuels sourced and used by ESEs at the subject facility over time, and by the subject facility's energy system as a whole, based on a design/configuration of the subject facility's the energy system that would exist were the changes described in the Subject ACM Design 213 to be actually implemented at the subject facility to alter the AIESC.

At that juncture, the ACM Assessor 305 is in receipt of both the AIEP 304 and the Subject ACM Energy Profile 312. The difference in fuels sourced and used by the subject facility's energy system under the original design/configuration, the AIESC, as represented by the AIEP 304, and the potential alternative design/configuration set out in the Subject ACM Design 213, as represented by the ACM Energy Profile 312, is then computed for each relevant temporal period, as indicated by process block 406. After conducting this computation, the ACM Assessor 305 compiles the information regarding the differences in fuels sourced and used by the subject facility's energy system and each of its ESEs, by relevant temporal period, in a record referred to as the Subject ACM Fuel Change record, which includes a characterization of the differences in fuels sourced and used between the two design/configurations. Examples of such differences include, but are not limited to the following:

1. A simple reduction in consumption of one fuel, as is likely in the case where the Subject ACM Design 213 calls for a dishwasher to be replaced by a similar performing but more energy efficient dishwasher.
2. A reduction in consumption of one fuel, and an increase in another, as is likely in the case where the Subject ACM Design 213 calls for an electric clothes dryer to be replaced by a gas clothes dryer.
3. A simple reduction in consumption of several fuels, such as electricity and natural gas, as is likely in the case where the Subject ACM Design 213 calls for the installation of thermal insulation in the subject facility's structure.
4. A reduction in demand of fuel from a fuel vendor, or even net production, as is likely in the case where the Subject ACM Design 213 calls for the installation and operation of a photovoltaic electricity generation system.

In the illustrative example, where the ACM under consideration in that ACM Iteration is the potential replacement of the facility's swimming pool filter pump, the Subject ACM Fuel Change record would report a monthly net reduction in electricity consumption of 108 kWh monthly. This may decrease over the life of the swimming pool filter pump as it deteriorates with time, or may increase as its rate of deterioration is less than that of some substitute, such as that of the original swimming pool filter pump.

That fuel source and use difference, captured in the Subject ACM Fuel Change record, is assigned a monetary value as represented by the marginal price or prices of each of the fuels concerned that would be in force at the subject facility's energy system under each of the two different design/configurations of energy system, and that price or those prices forecast to be in force over time. Should that fuel source and use difference under consideration, as represented in the Subject ACM Fuel Change record, be sufficiently large as to encompass more than one price tier at the marginal level of consumption of that fuel by the subject facility's energy system, then the value assigned is based on prorating the amount of the fuel source and use difference to subsequent, applicable neighboring price tiers on a weighted average basis as described subsequently. The record of the monetary values of the difference in the fuels sourced and used, by relevant temporal period, that would result were the Subject ACM Design 213 to be implemented at the subject facility, is known as the Subject ACM Fuel Value Change record.

For example, in the circumstance where consumption of a certain fuel by a facility's energy system subject to a RTPS (as exemplified in FIG. 5) is at a certain level over a certain period when operating under one design/configuration (e.g., 501 in FIG. 5) would be reduced by the implementation of a certain ACM, ACM A, to a lower level (to, e.g., 502 in FIG. 5), the fuel not consumed and therefore saved is assigned a value based on the price applicable at the marginal level of the subject facility's total volume, i.e., Price 5. In the circumstance where the same facility's consumption of the same fuel would be reduced by the implementation of a different ACM, ACM B, to an even lower level (to, e.g., 503 in FIG. 5), the fuel not consumed and therefore saved is assigned a value based on a weighted average of the several price levels in force at the marginal levels of the subject facility's total volume, with the prices prorated proportionally to the fuel amounts saved. The value of the fuel saved in this example is computed based on the volume from 501 to Amount 4 in FIG. 5 at Price 5, the volume from Amount 4 to Amount 3 in FIG. 5 at Price 4, and the volume from Amount 4 to 503 in FIG. 5 at Price 3.

Figure 5:
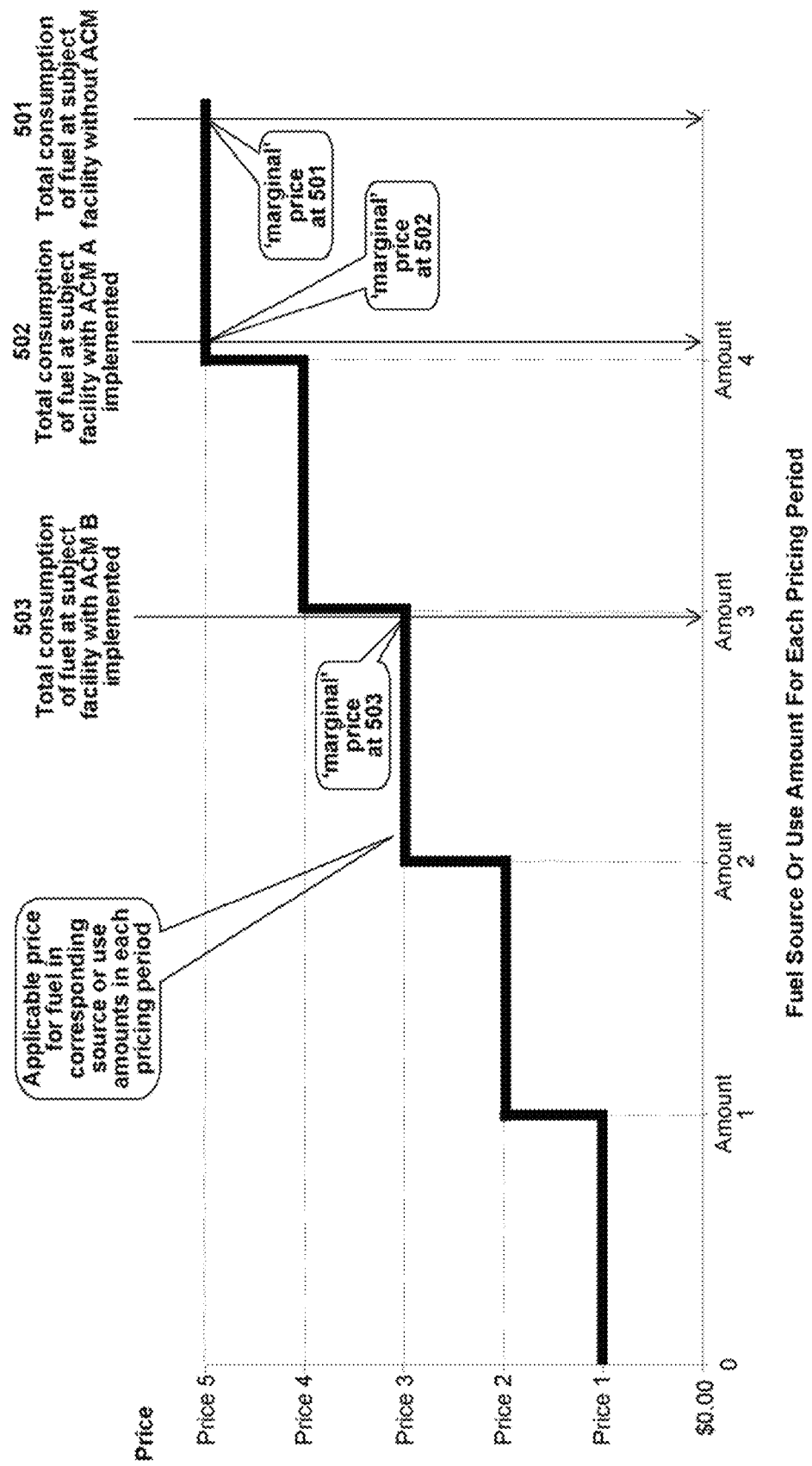
FIG. 5 is a graph that illustrates an exemplary Reverse Tiered Pricing Scheme, and is used to explain an approach to allocating marginal prices to Alternative Configuration Measures (ACMs) for use in computing their economics in accordance with an embodiment of the present invention.

In the illustrative example, where the ACM under consideration is the potential replacement of the facility's swimming pool filter pump, the Subject ACM Fuel Value Change record would report a value for the 108 kWh saved monthly of $54 monthly, since the marginal price is $0.50 per kWh; this assumes the facility's marginal amount of electricity demanded is at 501 in FIG. 5, and the 108 kWh saved brings the facility's marginal demand to 502 in FIG. 5. Should the savings have been 175 kWh, the facility's electricity demand would fall to 503 in FIG. 5, and the value of the electricity saved would be the sum of: 124 kWh (from 501 to Amount 4) at $0.50/kWh, which is $62.00; 50 kWh (from Amount 4 to Amount 3) at $0.40/kWh, which is $20.00; and 1 kWh (from Amount 3 to 503) at $0.30/kWh, which $0.30; for a total of $82.30 for that month. In the case of a uniform RTPS, that is without any TOU or other complicating features within the billing period, this computation is preferably executed for each month (the billing period) of the swimming pool filter pump's 13 year life, incorporating adjustments for changes that may occur over time, such as price inflation, to determine the nominal monetary value for each month.

Depending on the embodiment and potential selections regarding financial objective and financial performance, this same technique may be applied to set the value of fuel in ESEOA computations whether the fuel under consideration is sourced or used (i.e., consumed).

Depending on the embodiment and potential selections regarding financial objective and financial performance, the Subject ACM Fuel Value Change record may incorporate changes in non-fuel operating costs relating to the implementation of an ACM, including amounts and allocations to temporal periods as appropriate. Such non-fuel operating costs are preferably those specific to the subject facility and its operations, however, estimates and other approaches may be adopted.

Depending on the embodiment and potential selections regarding financial objective and financial performance, the Subject ACM Fuel Change record and Subject ACM Fuel Value Change record may be computed for the fuel source and use difference over the time limited to the Expected Life of the ACM and associated ESEs as appropriate; in circumstances where extended equipment lives are under consideration, such as where ACMs with life extending measures are contemplated, such computations may incorporate both the Expected Life of the ACM and the Extended Life of the ACM, as appropriate. Alternatively, the ESEOA may use other lengths of time for these computations, as directed by the ESE tool's user, administrator and/or manager, perhaps to comply with the financial objective (such as a payback time limitation) or other factors.

At the current juncture, with the Subject ACM Fuel Value Change record, the ACM Assessor 305 has the value, for each relevant temporal period in nominal monetary amounts, of the difference in fuels sourced and used that would result were the Subject ACM Design 213 affected on the current subject facility design/configuration, the AIESC. These monetary amounts contained in the Subject ACM Fuel Value Change record, for each relevant temporal period over the length of time used in the computations for that ACM (whether the Expected Life of the ACM and the Extended Life of the ACM, or some other length of time), may be summed in numerous ways such as to provide an Operating Gain for that ACM including, but not limited to;

(a) the ACM's Operating Gain Nominal Value, in which those nominal amounts in the Subject ACM Fuel Value Change record over the length of time used in the computations for that ACM are simply summed; and (b) the ACM's Operating Gain Present Value, in which those nominal amounts in the Subject ACM Fuel Value Change record over the length of time used in the computations for that ACM are first converted to their present values using an appropriate discount factor, and then summed.

Depending on the embodiment and potential selections regarding financial objective and financial performance, implementation costs may be incorporated into the EOM's evaluations; perhaps including none, some or all components of the costs of the ACM's implementation. In circumstances where financial performance has been defined and set such as to include implementation costs in some way, the ACM Assessor 305 uses the Subject ACM Design 213 to compute implementation costs, as indicated by process block 404, for each relevant temporal period they would be expected to occur should the ACM be implemented, preferably in reflection of the actual expected nominal monetary outlays over time that would be executed to affect the Subject ACM Design 213.

Components of implementation costs may include, but are not limited to; costs of appliance and/or equipment procurement and/or installation; any financing costs related to the implementation of the Subject ACM; other costs; less any net grants, rebates, incentives, and/or similar offsets, from any source, adjusted for their availability as a result of any other use and/or application already planned at that juncture. Financing costs may include, but are not limited to; incurred debt principal repayments and interest payments; initial monetary outlays and down payments; opportunity costs computed using an appropriate discount rate; fees and charges; and other costs. In accordance with an embodiment; these costs are compiled in a Subject ACM Implementation Cost record.

In accordance with an embodiment, ACM implementation cost information, including amounts and associations with, and/or allocations to, temporal periods as appropriate, is collected from the ESC tool's user, administrator and/or manager via the User Interface 201 and set as appropriate for use in computations.

Depending on the embodiment and potential selections regarding financial objective and financial performance, in addition to directly stored information, each of these costs and related information may be contained within respective ACM Design records.

Depending on the embodiment and potential selections regarding financial objective and financial performance, procurement and installation costs of any appliance and/or equipment, including amounts and associations and/or allocations to temporal periods as appropriate, may be those specific to the subject facility, and/or average and/or median market prices prevalent in the immediate geographic area in which the subject facility is located, and/or estimates may be adopted, among other approaches.

Depending on the embodiment and potential selections regarding financial objective and financial performance, finance costs of any type, including amounts and associations with, and/or allocations to, temporal periods as appropriate may be those applicable to the subject facility operator and/or other interested parties, computed as based on the information provided by the ESC tool's user, administrator and/or manager via the User Interface 201, as described previously. Moreover, the ESC tool's user may direct the attribution and/or allocation of financing terms to specific ACMs, including amounts and allocations to temporal periods as appropriate; in the absence of such inputs, financing terms may be automatically computed based on available terms in the applicable market relating to the subject facility, and be most closely aligned to the expected life of the ESEs concerned, and/or as directed by the ESC tool's administrator and/or manager.

At the current juncture, the ACM Assessor 305 has the implementation cost, for each cost component, for each relevant temporal period in nominal monetary amounts, that would be required to implement the Subject ACM Design 213 at the subject facility, in the Subject ACM Implementation Cost record. The monetary amounts contained in the Subject ACM Implementation Cost record may be summed in numerous ways such as to provide an Implementation Cost for the subject ACM including, but not limited to; (a) the ACM Implementation Cost Nominal Value, in which those nominal amounts in the Subject ACM Implementation Cost record are simply summed; and (b) the ACM Implementation Cost Present Value, in which those nominal amounts in the Subject ACM Implementation Cost record are first converted to their present values using an appropriate discount factor, and then summed.

The ACM Assessor 305 then computes the ACM Net Operating Gain, which may be defined in numerous ways depending on the embodiment and potential selections regarding financial objective and financial performance. In one approach, the ACM Assessor 305 subtracts none, some or all of the components of the implementation costs contained within the Subject ACM Implementation Cost record from some or all of the components of the monetary values contained within the Subject ACM Fuel Value Change record, for each corresponding temporal period, as indicated by process block 409; the result is the net nominal monetary value of implementing the ACM for each relevant temporal period, and when these are summed over the relevant temporal periods the sum is the ACM Net Operating Gain, and under this definition is known as a ACM Nominal Value. Note that the ACM Nominal Value may also be similarly computed by subtracting the ACM Implementation Cost Nominal Value from the ACM's Operating Gain Nominal Value. Alternatively, the ACM Assessor 305 may select none, some or all of the components of the implementation costs contained within the Subject ACM Implementation Cost record, convert them to their present values, and then subtract them from some or all of the components of the corresponding values contained within the Subject ACM Fuel Value Change record, after they are also converted to their present values, again as indicated by process block 409; the result is the net present value of implementing the ACM for each relevant temporal period, and when these are summed over the relevant temporal periods the sum is the ACM Net Operating Gain, and under this definition is known as a ACM Present Value. Note that the ACM Present Value may also be similarly computed by subtracting the ACM Implementation Cost Present Value from the ACM's Operating Gain Present Value.

In the illustrative example, in the circumstance where the ACM under consideration is the potential replacement of the facility's swimming pool filter pump and where electricity prices and pump performance are expected to remain constant for beyond the applicable time horizon, the Subject ACM Fuel Value Change record would contain a monthly value of fuel savings of $54 over the facility's swimming pool filter pump's 13 year life. In the circumstance where this ACM would be entirely implemented using debt financing, comprising 13 years of fixed monthly payments of, e.g., $25 monthly, then those payments are contained in the Subject ACM Implementation Cost record and are deducted from the corresponding amounts for each temporal period in the Subject ACM Fuel Value Change record. The resulting net computed savings of $29 for each month of the replacement swimming pool filter pump's 13 year life total $4,524; which is the ACM Net Operating Gain, under this definition is an ACM Nominal Value.

Depending on the embodiment and potential selections regarding financial objective and financial performance the ACM Assessor 305 may also compute an ACM Capital Efficiency Ratio. A capital efficiency ratio metric is a measure of the effectiveness of each monetary unit in creating net operating gain, may be defined in several ways, as described subsequently, and is often used in evaluations of financial attractiveness. An ACM Nominal Value Capital Efficiency Ratio is defined as an ACM Nominal Value divided by an ACM's Implementation Cost Nominal Value, and an ACM Present Value Capital Efficiency Ratio is defined as an ACM Present Value divided by an ACM's Implementation Cost Present. The ACM Assessor 305 also computes other financial performance measures, depending on the embodiment and potential selections regarding financial objective and financial performance, including those in the subsequent and separate description of financial performance.

In the illustrative example, in circumstances where the ACM under consideration is the potential replacement of the facility's swimming pool filter pump, where financial attractiveness is defined as to maximize outlaid capital efficiency, and where electricity price are expected to increase over time, the ACM Present Value amounted to $10,000. Since the ACM Implementation Cost is $1,500 (which is the $2,000 present value cost to procure and install the swimming pool filter pump, offset by $500 in utility company incentives), the ACM Capital Efficiency Ratio, in this case a ACM Present Value Capital Efficiency Ratio, is 10,000 divided by 1,500, or 6%.

As indicated by process block 410, the ACM Assessor 305 then records the ACM's financial performance results, including ACM Net Operating Gain, ACM Capital Efficiency Ratios, and other economic and other measures for that ACM.

The ACM Assessor 305 then selects one of the remaining ACMs in the List & Design of All Possible ACMs for that FRP Iteration and conducts the computations for that ACM to determine the Subject ACM Design 213, and subsequently it's ACM Net Operating Gain, ACM Capital Efficiency Ratios, and other economic and other measures. This is achieved by commissioning another ACM Iteration and utilizing the EM 102 to process the Subject ACM Design 213 to obtain the Subject ACM Energy Profile 312. With this, the ACM Assessor 305 then uses similar techniques as in the initial ACM Iteration to determine a Subject ACM Fuel Change record, Subject ACM Fuel Value Change record, and Subject ACM Implementation Cost record, and then a ACM Net Operating Gain, ACM Capital Efficiency Ratios, and other economic and other measures for the current ACM.

The ACM Assessor 305 uses the same procedure to compute the financial performance results for each ACM, individually and sequentially, including the ACM Net Operating Gains, ACM Capital Efficiency Ratios, and other economic and other measures, remaining in the List & Design of All Possible ACMs for that FRP Iteration. As indicated by process block 410, the ACM Assessor 305 compiles these financial performance results for each ACM.

In circumstances where the ACM Assessor 305 is assessing a Variable ACM, that is it includes one or more ESEs that have flexibility in fuel source and/or use capacity and perhaps operating performance, a Variable ESE, such as that described previously for photovoltaic solar generating systems with the ability to comprise varying amounts of photovoltaic panels and other associated equipment, the ACM Assessor 305 computes the financial performance associated with all or nearly all different possible capacity design/configurations for that ESE and/or Variable ACM. Depending on the embodiment and potential selections, the extent of these computations may be set by the ESC tool's user, administrator and/or manager.

Depending on the embodiment and potential selections, the ACM Assessor 305 may commence these computations at either the lower or higher end of the Variable ACM's Capacity Range, and continue its computations, in increments of minimum or other practical capacity change amounts particular for the relevant ESE, of financial performance through all possible or otherwise delineated capacity design/configurations for the relevant ESE to the opposite end of the Variable ACM's Capacity Range. The specific amounts defining the lower and upper ends of the Variable ACM's Capacity Range, the increment amounts within the Variable ACM's Capacity Range, and/or the choice of whether the starting point is at the lower or higher end of the Variable ACM's Capacity Range may be set by the ESE tool's user and/or administrator and/or manager, and/or may be specific to each Variable ACM, and/or may be set by some other means.

The amounts defining the lower end of the Variable ACM's Capacity Range may be zero, an arbitrary number, a number set as a minimum or near minimum by related market vendors or others, the number at which subsequent increments cause the computed financial attractiveness or financial value to be lower than the financial attractiveness or financial value respectively or other ACMs in an FRP Iteration (where only one Variable ACM is under consideration, and it is set to be the last ACM to be evaluated in that FRP Iteration), a number set by the ESE tool's user and/or administrator and/or manager or some number determined by other means. The amounts defining the higher end of the Capacity Range may be an arbitrary number, a number set as a maximum or near maximum by related market vendors or others, such as a potential utility company buyer, the number at which subsequent increments cause the computed financial attractiveness or financial value to be lower than the financial attractiveness or financial value respectively or other ACMs in an FRP Iteration (where only one Variable ACM is under consideration, and it is set to be the last ACM to be evaluated in that FRP Iteration), a number set by the ESE tool's user and/or administrator and/or manager or some number determined by other means.

Once the ACM Assessor 305 has completed these computations of the financial performance of each capacity design/configuration of the subject Variable ACM, it selects that design/configuration with the greatest financial attractiveness; subsequently setting its ACM Design, energy profile, financial performance and other factors based on that design/configuration selected, for the current FRP iteration. Such information remains valid for that FRP Iteration only, unless that Variable ACM is selected as the Successful ACM, in which case that Variable ACM's information remains valid to the end of the Price Scheme Iteration.

In the illustrative example, where a photovoltaic solar panel electricity generating system is set for consideration, the ACM Assessor 305 recognizes it as a Variable ACM. The smallest incremental capacity amount is recorded in its ACM Design as a linear 300 kWh per year, which is the production capacity for each panel were they installed in the conditions at the subject facility; the computation range is set to start at the lower capacity, and the lowest capacity set as 4 panels (as that is the minimum local installers are prepared to install); and the upper capacity set as either that capacity that would require $500,000 in initial outlay, or that capacity where the incremental change to the ACM Present Value of the system becomes negative and further incremental capacity increases would cause a decline in its ACM Present Value in the current FRP Iteration, or that capacity where the ACM Present Value Capital Efficiency Ratio is reduced to the point where further incremental capacity increases would cause the ACM Present Value Capital Efficiency Ratio to be less than that of any other ACM in the current FRP Iteration, whichever is the larger capacity. The ACM Assessor 305 then records the financial performance metrics, capacity and other characteristics of that photovoltaic solar panel electricity generating system as at that capacity level, e.g., as at 20 panels.

Referring back to FIG. 3, the ESEOA examines these financial performance results of each ACM to determine which, if any, ACMs have financial benefit that can be used to achieve the financial objective, as indicated by decision block 307.

The basis for this determination as to whether an ACM has financial benefit depends on the embodiment and potential selections regarding financial objective and financial performance. For example, this determination may simply be based on whether the Subject ACM Present Value is positive, or may be based on whether the ACM Present Values of all SACMs in the current FRP Iteration, when added to the Subject ACM Present Value, is less than a specific amount, such as that stipulated in a budget.

Whichever determination method is employed, should all ACMs in the List & Design of All Possible ACMs be determined to not have financial benefit, this is recorded at process block 308 in the FRP 106, which may be reported to the ESC tool user via the User Interface 201 depending on the embodiment and potential selections regarding financial objective and financial performance.

Should one or more ACMs be determined to have financial benefit, whichever determination method is employed, the results of each ACM's assessment by the ACM Assessor 205, that is each ACM's financial performance results, is examined to determine which one, should it be implemented at the subject facility, has the greatest financial attractiveness. The basis for this determination of each ACM's financial attractiveness depends on the embodiment and potential selections regarding financial objective and financial performance.

In accordance with an embodiment, this determination is based on the ACM Present Value Capital Efficiency Ratio. This measure is useful as it may lead to a FRP that is oriented around delivering maximized or near maximized wealth while requiring the least or little outlay for implementation.

As indicated by process block 309, whichever determination method is employed, the ACM with the greatest financial attractiveness, SACM 1, is selected and recorded in the FRP 308.

Figure 6:
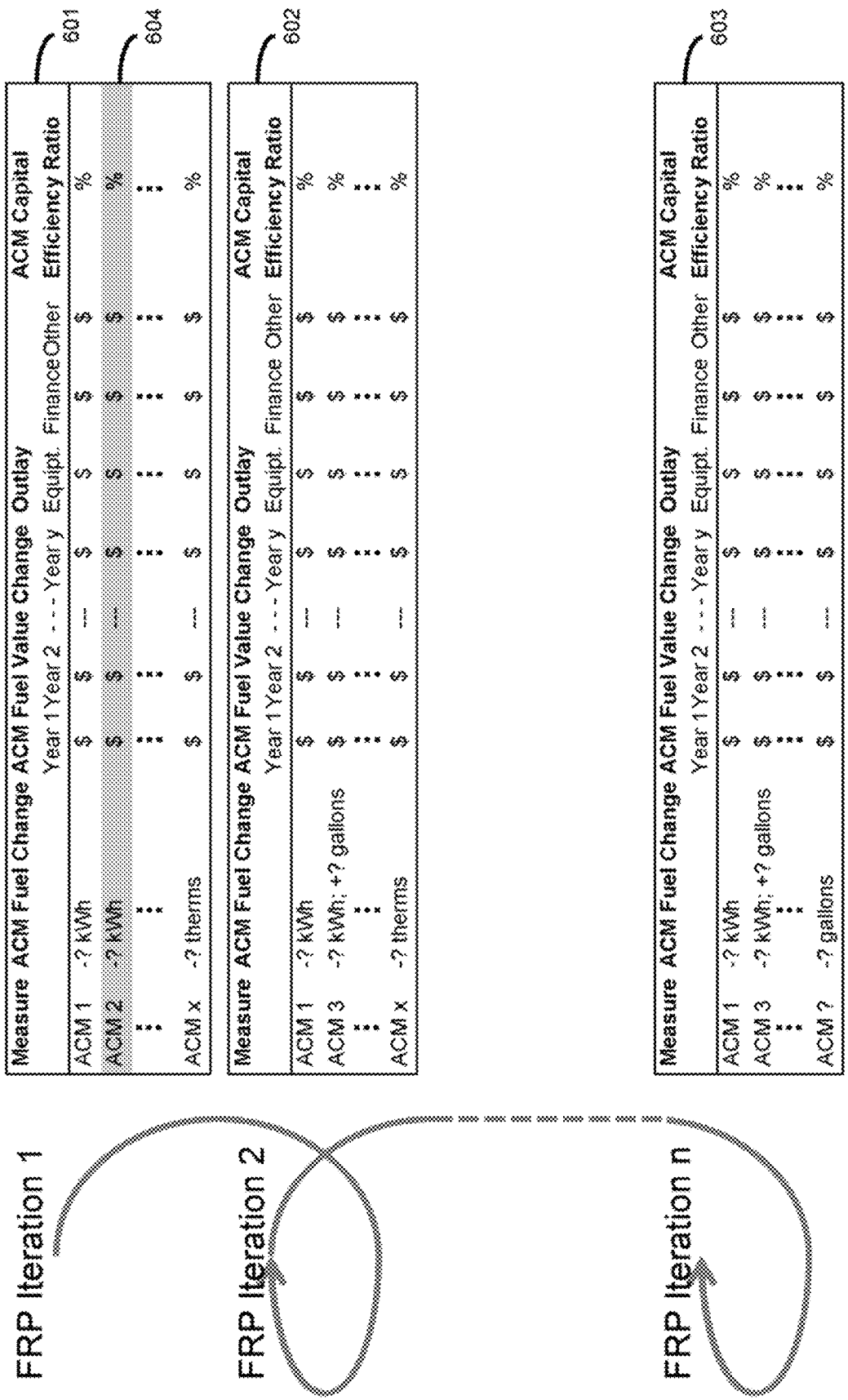
FIG. 6 is a diagram that that is used to explain an Energy System Economic Optimization Algorithm (ESEOA), according to an embodiment of the present invention, and its iterative processes.

FIG. 6 provides a conceptual illustration of the FRP Iteration process. 601 illustrates some of the key elements of information recorded for the first FRP Iteration for each ACM; including key elements of Subject ACM Fuel Change records, Subject ACM Fuel Value records, Subject ACM Implementation Cost records, and ACM values and ACM Capital Efficiency Ratios. One ACM, e.g., ACM 2 (identified by 604), is selected as the Successful ACM based on the ESEOA's evaluation of ACM financial performance results in the first FRM Iteration to determine which offers both financial benefit, and the greatest financial attractiveness. In this illustration, ACM 2 would thus be set as SACM 1.

In the illustrative example, where the replacement of the facility's swimming pool filter pump (i.e., ACM 2, identified by 604) is selected as SACM 1 as it possesses the greatest ACM Capital Efficiency Ratio in FRP Iteration 1, ACM 2 is removed from the list of ACMs that are candidates for consideration in subsequent FRP Iterations, and the marginal fuel price utilized in subsequent FRP Iteration computations by the ACM Assessor 305 is set to the new level of electricity consumption the facility would have were the swimming pool filter pump replaced as specified in that ACM Design.

Note that, for each FRP Iteration, the only financial performance results, including ACM Net Operating Gains, ACM Capital Efficiency Ratios, and other economic and other measures, that remain valid beyond the completion of that FRP Iteration are those for the Successful ACM; in the first FRP Iteration it is those financial performance that relate to SACM 1. Subsequent FRP Iterations develop new financial performance results for the ACMs considered in those FRP Iterations, for each generating new ACM Net Operating Gains, ACM Capital Efficiency Ratios, and other economic and other measures.

The EOM 104 then continues to develop the FRP within that Price Scheme Iteration such that it includes all those ACMs, that have been listed for consideration, that will deliver a reconfigured energy system at the subject facility that, depending on the embodiment and potential selections regarding financial objective, maximizes or near maximizes financial performance toward a financial objective.

The ESEOA identifies the next, if any, ACM that should be included in the FRP in next round of computations; the second FRP Iteration within the current Price Scheme Iteration. That component of each FRP Iteration conducted in the EM 102 is represented by block 314.

In commencing the second FRP Iteration, the EOM 104 and ESEOA compile the first TBESC, as represented by block 310, the subject facility's energy system design/configuration baseline to be used in the ACM Iteration assessments of the current FRP Iteration; compiled based on adjusting the initial energy system design/configuration, the AIESC, to incorporate the design/configuration alterations contemplated by the Subject ACM Design 213 of the SACM of the previous FRP Iteration, in this case SACM 1. The TBESC 222 record contains the same type of information as the AIESC; though differs from the AIESC in that one or more ESE Performance Profiles and/or ESE Operating Parameters now incorporate the ACM Design information of the SACM of the previous FRP Iteration, in this case SACM 1.

In addition, the ACM Assessor 305 adjusts its records of the availability of grants, rebates and tax incentives, including tax credits, to reflect what residuals are available to be applied to ACMs in the current FRP Iteration.

After the first TBESC 222 is compiled and passed by the EOM 104 to the EM 102, the EM 102 uses that first TBESC 222 to compute the first TBEP 304, which is an energy profile of the subject facility's energy system as it would be were the subject facility's energy system configured as set out in the first TBESC 222.

The TBEP 304, represented by data block 304, is passed to the ACM Assessor 305 for use in its second FRP Iteration assessments as a baseline to determine the financial performance of each of the second set of ACM Designs.

The TBESC is also used within the EOM 104 to create a new List & Design of All Possible ACMs, as represented by block 306. As in the previous FRP Iteration, the List & Design of All Possible ACMs 401 is passed on and used to control which ACM is assessed in each ACM Iteration.

Again, and in each ACM Iteration, the ACM Assessor 305 passes Subject ACM Designs to the EM 102 and, in turn, receives a Subject ACM Energy Profile 312 from the EM 102 for each. This time, each Subject ACM Energy Profile 312 characterizes the energy system's energy profile, were the first TBESC 222 changed to reflect the subject facility's energy system design/configuration described in the respective Subject ACM Design 213. Subject ACM Energy Profiles are subsequently used by the ACM Assessor 305 in a comparison with the first TBEP 304 in its computations to determine the financial performance of each ACM.

For each ACM in the second List & Design of All Possible ACMs, the ACM Assessor 305 computes financial performance results, including ACM Net Operating Gains, ACM Capital Efficiency Ratios, and other economic and other measures, using the same approaches described previously as for the first FRP Iteration.

Again, the ESEOA examines these results to determine whether each ACM has financial benefit, as indicated by decision block 307, using the same metric as in the first FRP Iteration.

Again, should all ACMs in the List & Design of All Possible ACMs be determined to not have financial benefit, this is recorded at process block 308 in the FRP 106, which may be reported to the ESC tool user via the User Interface 201 depending on the embodiment and potential selections regarding financial objective and financial performance.

Should one or more ACMs have financial benefit, the ACM's financial performance results are examined to determine which has the greatest financial attractiveness. That ACM with the greatest financial attractiveness is selected as SACM 1 and recorded as such in the FRP 308. In the conceptual illustration of FIG. 6, 602 illustrates some of the key elements of information recorded for each ACM for the second FRP Iteration.

The EOM 104 further continues to develop the FRP within the current Price Scheme Iteration, conducting additional FRP Iterations each time the EOM 104 identifies one or more ACMs with financial benefit in the previous FRP Iteration, and adding SACMs to the FRP as described for the previous FRP Iterations. This process of FRP Iterations continues until either all ACMs listed for consideration are selected for inclusion in the FRP, or until a FRP Iteration finds no further ACM has financial benefit. The TBESC 222 of each previous FRP Iteration is adjusted to incorporate the design/configuration contemplated in the ACM Design of the SACM of the same previous FRP Iteration, the resulting TBESC 222 becoming the TBESC 222 for the current FRP Iteration. The Subject ACM Energy Profile 312 of the SACM of that same previous FRP Iteration becomes the TBEP 304 for the current FRP Iteration. This sequence is illustrated conceptually in FIG. 6, where 602 depicts the key information for the second FRP Iteration, and 603 depicts the key information for the last FRP Iteration.

Price Scheme Iterations and FRP Publication

Once the ESEOA has completed financial performance computations for the first Price Scheme Iteration, as described previously, the FRP for the first Price Scheme Iteration is compiled and its corresponding overall and ACM financial performances are computed. At this juncture, depending on the embodiment and potential selections regarding financial objective, an FRP may be published. FIG. 9 illustrates an example of publishing an FRP by displaying the FRP on the screen of the User Interface 201, according to an embodiment of the present invention.

In circumstances where additional price schemes are desired for consideration by the ESC tool's user, administrator and/or manager, the ESC tool conducts further Price Scheme Iterations such as to compile a FRP and corresponding financial performance results for each. As can be appreciated from the above discussion, one price scheme (e.g., an existing price scheme) can include a straight/regular RTPS for electricity and a straight/regular RTPS for gas; a further price scheme can include a Seasonal Weekly Daily RTPS (e.g., where each season possesses its own set of Weekly Daily RTPSs) for electricity and a straight/regular RTPS for gas; another price scheme can include a straight/regular RTPS for electricity and a Seasonal Weekly Daily RTPS for gas; still another price scheme can include a Seasonal Weekly Daily RTPS for electricity and a Seasonal Weekly Daily RTPS for gas. There can also be price schemes associated with different energy supply companies/utilities where there is the option of purchasing energy from different suppliers, wherein each supply company/utility may or may not offer different types of TPSs, leading to numerous possible other combinations. These are just a few examples, which are not meant to be all encompassing, of different price schemes that can be used to perform multiple Price Scheme Iterations, in accordance with specific embodiments and potential selections regarding financial objective of the present invention.

Depending on the embodiment and potential selections regarding financial objective, once all Price Scheme Iterations that are desired for consideration by the ESC tool's user, administrator and/or manager have been conducted, the ESC tool may compare the financial performance results of each and select the FRP for that Price Scheme Iteration with the greatest financial value, as defined and set by the ESC tool's user, administrator and/or manager.

Depending on the embodiment and potential selections regarding financial objective and financial performance, the User Interface 201 publishes the selected FRP, listing the respective SACMs in their order of computational selection, and incorporating the associated financial performance and other information for each (including, e.g., the ACM Nominal Value, ACM Present Value, the ACM Nominal Value Capital Efficiency Ratio and the ACM Present Value Capital Efficiency Ratio and other economic and other measures including, but not limited to, those that serve the basis of the financial objective requested by the ESC tool's user, those regarding implementation and associated information, those regarding carbon footprint and associated information, those regarding budget and associated information.

Depending on the embodiment and potential selections, the ESC tool may utilize techniques to reduce the computations needed to develop FRPs including, but not limited to, circumventing, shortening and/or avoiding computations that would not be applicable, rational, beneficial, practical, or redundant, at suitable junctures in its computations. An example of such computation curtailment is often present in the assessment of solar photovoltaic panels, where photovoltaic system installation vendors are often unwilling to install the systems with fewer than a specified minimum number of panels, and/or the facility's operator may be unwilling to consider a solar photovoltaic electricity generation system with great enough capacity that it would result in the facility sourcing more electricity in a certain temporal period greater than the net total electricity used by the entire energy system under the AIESC in that same temporal period, or some other amount. The tool's user, administrator and/or manager may direct the ESC tool to activate the systems and methods, automatically and/or specifically, at applicable junctures in the ESE tool's computations or allow computations to proceed with out alteration.

Financial Performance

The ESC tool is designed to maximize or near maximize financial performance toward a financial objective, and metrics it utilizes may be defined and/or set in numerous ways. Financial performance metrics may be computed for ACMs individually, or summed in some way to reflect the performance of groups of ACMs, such as for an entire FRP. While there are many junctures in the ESC tool's computations where a financial performance measure of one kind or another is required to be evaluated, those junctures are most sensibly grouped into four types:

(a) Financial Benefit in an ACM Iteration: At the evaluation phase towards the end of each ACM Iteration computation, where a Subject ACM is being evaluated as to whether it offers any "financial benefit," and so whether it should be included in further, subsequent, considerations as a SACM candidate;

(b) Financial Attractiveness in an ACM Iteration: Subsequently, also at the evaluation phase towards the end of each ACM Iteration computation, where a Subject ACM has been designated as a SACM candidate, and its "financial attractiveness" is needed so that it may be comparatively evaluated against the financial attractiveness of other SACM candidates in that FRP Iteration to facilitate the selection of one as the SACM for that FRP Iteration;

(c) Financial Value in an ACM Iteration: Subsequently, also at the evaluation phase towards the end of each ACM Iteration computation, where a Subject ACM has been designated as the SACM, and its "financial value" is needed so that its contribution to the overall financial value of the FRP to which it is being added may be computed;

(d) Total Financial Value in a Price Scheme Iteration: Subsequently, at evaluation phase towards the end of each Price Scheme Iteration computation, where the overall financial value of the FRP under current consideration is being computed; and Depending on the embodiment, for purposes of computational expediency, it may be desirable to compute all the potential and/or needed financial performance metrics for an ACM in each circumstance and energy system configuration under current consideration at the juncture in which that ACM, circumstance and energy system configuration is actually under consideration; though conducting such financial performance metric computations on an as-needed basis is also feasible. For example, at a juncture where an ACM is being evaluated for potential financial benefit, when the metrics required to determine financial benefit are being computed, it is likely to be most efficient to also compute at that same juncture any other metrics that may subsequently be required to compute financial attractiveness and financial value.

The financial performance computations at each type of computational juncture is discussed separately below:

Financial Performance Computations in ACM Iterations: Towards the end of each ACM Iteration computation the Subject ACM is evaluated for its potential to be included in, and potential contribution to, the FRP under consideration.

Numerous approaches may be employed in evaluating an ACM; each approach employing specific metrics, and each metric comprising specific components. Some of the most useful components, metrics and approaches are presented below:

Components to ACM Iteration Financial Performance Measures: There are numerous useful components that may be utilized in financial performance measures including, but not limited to operating gain and implementation costs, which are discussed below.

Operating Gain: Operating gain relates to some or all the changes in the ongoing operating economics that would result from the implementation of the Subject ACM; principally derived from the change in the subject facility's fuel source or use as a result of that implementation, though may include consideration of changes in other operating costs. This change in ongoing operating economics may manifest itself in the form of monetary savings as a result of a reduction in fuel use or change in mix of fuel sourced or used, or may actually be an increase in monetary costs as a result of an increase in fuel use or change in mix of fuel sourced or used. Similar changes in ongoing operating economics may be manifested by changes in other operating costs. Operating gain is often distributed over time, whether distributed arbitrarily, or distributed over the life of an ESE, or distributed by some other method. Such operating gain distribution is usually grouped in discrete and evenly spaced periods. That operating gain that is summed may be summed using several approaches, the most common are:

I. Operating Gain Nominal Value: In this approach the nominal monetary amounts of operating gain attributed to each period, whether positive or negative, are simply summed.

II. Operating Gain Present Value: In this approach the nominal monetary amounts of operating gain attributed to each period, whether positive or negative, are first converted to their present values using an appropriate discount factor, and then summed.

Implementation Costs: In many circumstances it is desirable and/or sensible to deduct from the operating gain of the Subject ACM some or all of the costs of its implementation. Components of such implementation costs include, but are not limited to:
(a) Costs of appliance and/or equipment procurement;
(b) Costs of appliance and/or equipment installation;
(c) Other costs;
(d) Any financing costs related to the implementation of the Subject ACM, including any interest and/or capital opportunity costs;
(e) Any grants, rebates, incentives, and/or similar that may offset some or all of the above costs.

Implementation costs are often distributed over time, whether distributed arbitrarily, or distributed in a manner reflecting actual expected timing of payments, or distributed by some other method. Those implementation costs that are summed may be summed using several approaches, the most common are:

I. Implementation Cost Nominal Value: In this approach the nominal monetary amounts of implementation costs to be summed are simply summed.

II. Implementation Cost Present Value: In this approach the nominal monetary amounts of implementation costs to be summed are first converted to their present values using an appropriate discount factor, and then summed.

Metrics for ACM Iteration Financial Performance Measures: There are numerous metrics that may be utilized in financial performance computations including, but not limited to, net operating gain metrics and capital efficiency ratio metrics, which are discussed below:

Net Operating Gain Metrics: The net operating gain metric is a measure of monetary gain and may be defined in several ways including, but not limited to:
(a) Operating Gain Nominal Value
(b) Operating Gain Nominal Value less some Implementation Cost Nominal Value
(c) Operating Gain Nominal Value less all Implementation Cost Nominal Value
(d) Operating Gain Present Value
(e) Operating Gain Present Value less some Implementation Cost Present Value
(f) Operating Gain Present Value less all Implementation Cost Present Value Capital Efficiency Ratio Metrics: The capital efficiency ratio metric is a measure of the effectiveness of each monetary unit in creating net operating gain and may be defined in several ways including, but not limited to:
(g) Net Operating Gain divided by some Implementation Cost Nominal Value
(h) Net Operating Gain divided by all Implementation Cost Nominal Value
(i) Net Operating Gain divided by some Implementation Cost Present Value
(j) Net Operating Gain divided by all Implementation Cost Present Value Where "Net Operating Gain" in (g) through (j) may be defined as set out in each of (a) through (f); some combinations being more useful and/or sensible than others, as addressed below.

Approaches to ACM Iteration Financial Performance Measures: While there are numerous approaches to evaluating the financial performance of Subject ACMs, some are more useful and/or sensible than others, and several useful approaches are outlined below. Further, the approach to financial performance may be chosen based on the financial objectives of the facility operator, examples of which are discussed below.

1. Operator Wealth: One approach to delivering a FRP that maximizes or near maximizes operator wealth, may be achieved by simply identifying economically positive ACMs, and selecting that ACM with the greatest positive economic contribution in each FRP Iteration. An example, and preferred, approach to accomplish this is to use the ACM Present Value Capital Efficiency Ratio, evaluating it for positivity in the financial benefit evaluation of each ACM Iteration, and evaluating it for relative magnitude in comparison to other ACMs in the financial attractiveness evaluation of each FRP Iteration. A preferred definition of ACM Present Value Capital Efficiency Ratio is as set out in (j) above, where Net Operating Gain is as set out in (f); this approach makes a full accounting of most, if not all, the economic factors facing the facility operator. In this preferred approach example, the financial value of a SACM selected in a FRP Iteration is the Net Operating Gain is as set out in (f). After all FRP Iterations have been completed, the actual wealth delivered to the operator of an implementation of the FRP is simply computed as the sum of all the Net Operating Gains of those SACMs in the FRP.

2. Operator Budget: An operator, instead of maximizing or near maximizing wealth, may be instead prefer to implement as many ACMs as possible within a certain budget. This budget must be specified, in choice of financial performance metric and amounts, and must naturally have a value less than the maximized or near maximized value as described in A. above. Assuming the budget metric is the same metric as described in the example in A. above, the budget value can only be any amount less than the maximized or near maximized amount for each Subject ACM in A. above; it may be positive, zero, even negative (note that it is negative in circumstances where the operator is willing to end up with a net outgoing in wealth over the periods addressed by the FRP's components). Under this approach, computations are conducted and SACMs selected as in A. above, however, ACMs are considered financially beneficial and SACMs continue to be selected even where their ACM Present Value Capital Efficiency Ratio, (j), is negative; as long as the FRP's total financial value, the Net Operating Gain of all the SACMs in that FRP, remains less than the budget specified. In summary, in this approach, the financial benefit evaluation of each ACM Iteration is based on the FRP's total financial value; the financial attractiveness evaluation and selection of a SACM in each FRP Iteration is based on the highest ACM Present Value Capital Efficiency Ratio; and the financial value of the SACM in each FRP Iteration is based on the Net Operating Gain of that SACM.

3. Operator Target: An operator, instead of maximizing or near maximizing wealth or implementing as many ACMs as possible within a certain budget, may prefer to maximize or near maximize some other objective within a budget. Those other objectives may be maximizing green objectives within a budget, such as minimizing or near minimizing carbon footprint totals, or reducing fuel consumption of one sort or another, or some other objective. Moreover, approaches may be combined to define financial performance. In each case monetary gains of ACMs with highly positive capital efficiency ratios may be used to subsidize ACMs with less positive or even negative capital efficiency ratios, as long as the SACMs total monetary amount remains less than a specified budget, or some other budget specification that may be defined.

In many circumstances, only one approach to financial performance may sensibly be used in any one FRP, although many combinations are actually possible.

Inclusion of Predefined ACMs: Depending on the embodiment and potential selections regarding financial objective and financial performance, depending upon the financial objective, it may be mandated that one or more specified ACMs must be included in the FRP. For example, for one reason or another, the ESC tool's user, administrator and/or manager may decide that, if anything is done, then before anything else, insulation must be installed in the attic, regardless of whether it has the most, or even a, positive capital efficiency ratio. In such a circumstance, the first ACM Iteration will evaluate that ACM or ACMs mandated, in the order mandated, to determine whether it or they can be implemented in a way that would create wealth for the operator or that it would remain within the specified budget, depending on the approach adopted for that FRP.

Forced Limitation of Parameters: In some circumstances, the operator may prefer to evaluate ACMs based on their ability to meet certain parameters. One approach that is often desired is the selection of ACMs that pay back their implementation costs within a certain period, however that metric may be defined, whether they create operator wealth or meet a mandated budget specifications or some other objective in that period.

Examples of ACM Iteration Financial Performance: While there are numerous approaches to accomplishing maximized or near maximized financial performance in the compilation of an FRP, several are discussed below, each utilizing the descriptions and other material from above as appropriate:

1. Maximize Operator Wealth: Depending on the embodiment and potential selections regarding financial objective and financial performance, an approach to developing an FRP that would maximize or near maximize the wealth of facility operators is to adopt the approach described above under Approaches to ACM Iteration Financial Performance Measures. Wherein, a positive value for the ACM Present Value Capital Efficiency Ratio (defined as set out in (j) above, where Net Operating Gain is as set out in (f) above) indicates the Subject ACM has financial benefit; for those Subject ACMs determined as having financial benefit, the one with the greatest ACM Present Value Capital Efficiency Ratio is selected as the SACM with the greatest financial attractiveness in any FRP Iteration; and the overall financial value in monetary terms of the corresponding FRP developed is simply the sum of the financial values of all the SACMs in that FRP, in this case the sum of the Net Operating Gains (defined as set out in (f) above) of all the SACMs in that FRP.

2. Maximize Operator Change: Depending on the embodiment and potential selections regarding financial objective and financial performance, an approach to developing an FRP that would deliver facility operators with the greatest or near greatest amount of energy system change without altering the wealth of the facility operator is to adopt the approach described above under Approaches to ACM Iteration Financial Performance Measures. This corresponds to the circumstance where the budget is set at zero. Wherein, Subject ACMs are evaluated as having financial benefit in each FRP Iteration as long as the sum of the Net Operating Gains (defined as set out in (f) above) of that Subject ACM plus that of all SACMs already in that FRP are greater than zero. Out of all those Subject ACMs evaluated as having financial benefit, one is selected as the SACM with the greatest financial attractiveness in any FRP Iteration based on having the greatest ACM Present Value Capital Efficiency Ratio (defined as set out in (j) above, where Net Operating Gain is as set out in (f) above). Under this approach, the FRP would have a zero or slightly positive overall financial value to the facility operator, computed as in the evaluation of overall financial value by summing the Net Operating Gains of all SACMs in that FRP.

3. Fund Operator Desired Change: Depending on the embodiment and potential selections regarding financial objective and financial performance, an approach to developing an FRP that would deliver facility operators with a specific energy system change, as defined in a particular ACM chosen by a facility operator, without altering the wealth of that facility operator is to adopt the approach described in 2. above, however in this circumstance the chosen ACM is forced to be the ACM in the first FRP Iteration. For example, a homeowner may want to buy new windows, which are suspected to have a negative Net Operating Gain (again, defined as set out in (f) above), and is prepared to implement other ACMs that would have a positive Net Operating Gain such that they effectively pay for the desired new windows. Thereby, in the second FRP Iteration, any ACM evaluated as providing a positive Net Operating Gain from that juncture would be evaluated as having financial benefit, and the ones selected as SACMs in FRP Iterations subsequent to the first would be based on which has the greatest ACM Present Value Capital Efficiency Ratio (again, defined as set out in (j) above, where Net Operating Gain is as set out in (f) above), which is used to evaluate financial attractiveness. Under this approach also, the FRP would have a zero or slightly positive overall financial value to the facility operator, computed as in the evaluation of overall financial value by summing the Net Operating Gains of all SACMs in that FRP.

4. Maximize Operator 'Greenness' Within A Budget: Depending on the embodiment and potential selections regarding financial objective and financial performance, an approach to developing an FRP that would deliver facility operators with the smallest facility energy system carbon footprint without altering the wealth of the facility operator is to adopt the approach described above under Approaches to ACM Iteration Financial Performance Measures; 1. Operator Objective; A. Operator Target; in the circumstance where the budget is set at zero. Wherein, Subject ACMs are evaluated as having financial benefit in each FRP Iteration as long as (i) they reduce the carbon footprint of the facility, and (ii) the sum of the Net Operating Gains (defined as set out in (f) above) of that Subject ACM plus that of all SACMs already in that FRP are greater than zero. Out of all those Subject ACMs evaluated as having financial benefit, one is selected based on having the greatest ACM Present Value Capital Efficiency Ratio (defined as set out in (j) above, where Net Operating Gain is as set out in (f) above)), which is used to evaluate financial attractiveness. Again, under this approach, the FRP would have a zero or slightly positive overall financial value to the facility operator, computed as in the evaluation of overall financial value by summing the Net Operating Gains of all SACMs in that FRP. Notably, iterative and other optimization computation techniques may also be used to select the SACMs such they reduce the facility's carbon footprint to the maximum or near maximum within the constraints of meeting the requirements that the operator's wealth is not altered.

Financial Performance Computations in Price Scheme Iterations

Towards the end of each Price Scheme Iteration computation an overall financial value is assigned to that Price Scheme Iteration and its associated FRP, computed by summing the financial values of all the SACMs in that FRP.

This value may be used in a comparison with other Price Scheme Iteration values to select that Price Scheme Iteration with the greatest overall financial value, together with its associated FRP. Alternatively, other approaches may be employed to select an FRP of each Price Scheme Iteration, should other objectives be desired. There are numerous metrics that may be computed in ACM Iterations in the development of FRPs, and these may be used to compute Price Scheme Iteration values. A preferred approach is to use the FRP's Net Operating Gain (as defined as set out in (f) above) in computations of overall financial value, though other metrics may be used.

Summary of Various Embodiments

Figure 10:
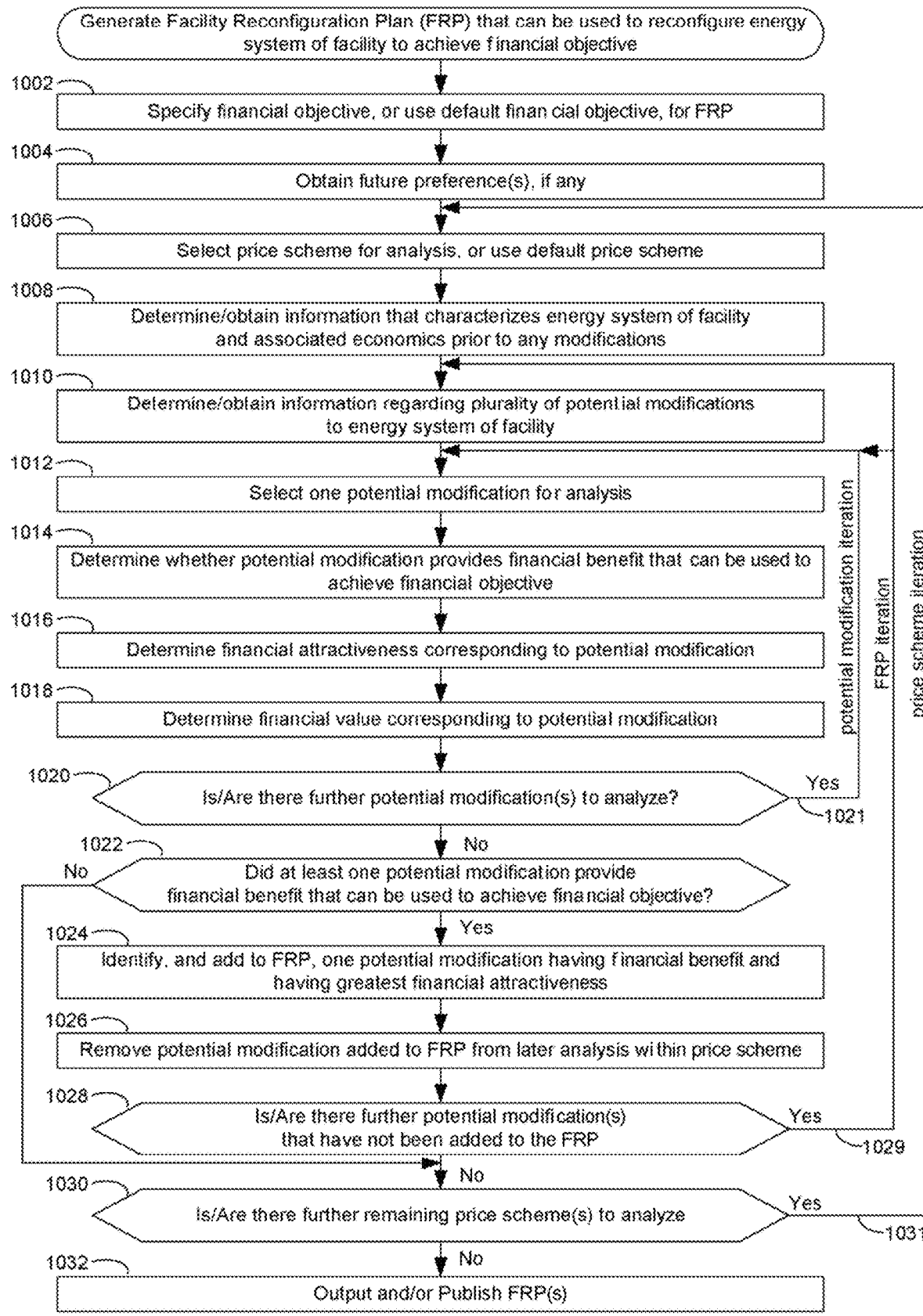
FIG. 10 is a high level flow diagram that is used to summarize various embodiments of the present invention.

FIG. 10 is a high level flow diagram that is used to summarize various embodiments of the present invention that can be used to generate an FRP that can be used to reconfigure an energy system of a facility to achieve a financial objective.

Referring to FIG. 10, at step 1002, a financial objective can be specified via a user interface (e.g., 201), or a default financial objective can be used. It is also possible that a single predetermined financial objective is defined. As was described above, exemplary financial objectives can be to maximize wealth associated with the energy system, maximize changes to the energy system given a specified budget, minimize carbon footprint of the energy system given a specified budget, minimize dependency of the energy system on one or more specified fuel sources given a specified budget, or to offset a loss of wealth associated with implementing a specified desired modification to the energy system. Use of alternative financial objectives are possible and within the scope of the present invention.

At step 1004, future preferences, if any, are obtained. FIG. 8, briefly discussed above, illustrates an exemplary input screen that enables such future preferences to be specified by a user, administrator and/or manager. Such future preferences can specify a user's, administrator's and/or manager's willingness to implement and/or limit one or more potential modifications.

At step 1006, a fuel price scheme can be specified via a user interface (e.g., 201), or a default fuel price scheme can be used. Examples of different types of fuel price schemes were described above. Where there is a desire to consider multiple alternative fuel price schemes, multiple fuel price schemes can be specified, and one is selected at step 1006.

At step 1008, information that characterizes the energy system of the facility and associated economics prior to any modifications is determined or otherwise obtained. As was described in detail above, in accordance with specific embodiments, step 1008 can include determining or otherwise obtaining a list of ESEs included in the energy system of the facility. Exemplary ESEs include, but are not limited to: lighting equipment, a dishwasher, a clothes dryer, a refrigerator, a water heater, air heating equipment, air cooling equipment, windows, wall structure, wall insulation, ceiling structure, ceiling insulation, a swimming pool filter pump and photovoltaic solar panels. Additionally, step 1008 can include determining or otherwise obtaining corresponding fuel source, usage, performance profile and operating parameter information for each ESE included in the list of ESEs, as well as corresponding fuel pricing structure and pricing level information for each fuel source associated with the ESEs included in the list of ESEs.

At step 1010, information regarding a plurality of potential modifications to the energy system of the facility is determined or otherwise obtained. As was described in detail above, in accordance with specific embodiments, step 1010 can include determining or otherwise obtaining a list of ACMs by identifying a plurality of ACMs that each can be used to alter one or more of the ESEs included in the list of ESEs. Additionally, step 1010 can include determining or otherwise obtaining corresponding fuel source, usage, performance profile and operating parameter information for the ESEs in each ACM included in the list of ACMs, as well as corresponding pricing structure and pricing level information for each fuel associated with the ACMs included in the list of ACMs. Each ACM can alter one or more ESEs included in the list of ESEs in one or more of the following manners, but is not limited thereto: replacing one or more ESEs, removing one or more ESEs, adjusting a performance profile of one or more ESEs, or adjusting one or more operating parameters of one or more ESEs. Further, it is noted that one or more ACMs can be a variable ACM, which was explained above. Where one or more future preferences were obtained at step 1004, one or more of the ACMs may be eliminated, added, bundled, limited, prioritized or adjusted based on future preference(s), as was described in additional detail above.

Steps 1010-1024 are then performed to determine which one of the potential modifications (e.g., which one of the ACMs), if any, is to be added to the FRP. More specifically, at step 1012, one of the potential modifications is selected for analysis. This selection can be performed in a predetermined order or a random order, but is not limited thereto. Alternatively, where one or more potential modifications is/are mandated by a user, administrator and/or manager, a mandated potential modification should be initially selected. For the one potential modification currently being analyzed, at steps 1014, 1016 and 1018, there are determinations, respectfully, of: whether the potential modification provides a financial benefit that can be used to achieve the financial objective; a financial attractiveness corresponding to the potential modification; and a financial value of the potential modification. In accordance with an alternative embodiment, step 1016 and/or step 1018 can be skipped where there has been a determination at step 1014 that the one potential modification currently being analyzed does not provide a financial benefit that can be used to achieve the financial objective. In accordance with an embodiment, each determination of whether a potential modification provides a financial benefit that can be used to achieve the financial objective, is a binary determination whose result is either yes or no.

At step 1016, the financial attractiveness can be determined in one of many different manners. For example, the financial attractiveness can determined by determining one of the following, but is not limited thereto: a net operating gain metric equal to an operating gain nominal value less no implementation cost; a net operating gain metric equal to an operating gain nominal value less some implementation cost nominal value; a net operating gain metric equal to an operating gain nominal value less all implementation cost nominal value; a net operating gain metric equal to an operating gain present value; a net operating gain metric equal to an operating gain present value less some implementation cost present value; a net operating gain metric equal to an operating gain present value less all implementation cost present value; a capital efficiency ratio metric equal to a net operating gain divided by some implementation cost nominal value; a capital efficiency ratio metric equal to a net operating gain divided by all implementation cost nominal value; a capital efficiency ratio metric equal to a net operating gain divided by some implementation cost present value; a capital efficiency ratio metric equal to a net operating gain divided by all implementation cost present value; an extent of reducing carbon footprint or creating a carbon offset within a specified budget; or an extent of reducing net demand (or increasing net supply) of one or more specified fuel with respect to and external vendor (or buyer) within a specified budget. The specific financial attractiveness that is appropriate to generate an FRP may be dependent upon the specific financial objective. However, there are certainly more then one way of determining financial attractiveness that can be appropriate for a specific financial objective.

At step 1020 there is a determination of whether there is/are further potential modification(s) to analyze. If the answer to step 1020 is yes, then flow returns to step 1012, as indicated by arrow 1021. Steps 1012-1020 can be referred to collectively as an ACM iteration, or more generally, as a potential modification iteration. As can be appreciated from the flow diagram, steps 1012-1020 are repeated until there are no more potential modifications (e.g., no more ACMs) to analyze, at which point flow proceeds to step 1022.

At step 1022 there is a determination of whether at least one of the potential modifications being analyzed (during the most recently performed potential modification iterations) provides a financial benefit that can be used to achieve the financial objective. If the answer to step 1022 is yes, then flow proceeds to step 1024 where the one potential modification providing a financial benefit and having a greatest financial attractiveness is identified and added to the FRP. Then, as indicated at step 1026, the potential modification just added to the FRP is removed from later analysis (within the fuel price scheme currently being analyzed).

At step 1028 there is a determination of whether there is/are further potential modification(s) that have not been added to the FRP. If the answer to step 1028 is yes, then flow returns to step 1010, as indicated by arrow 1029 (or alternatively to step 1012 as indicated by a dashed line). Steps 1010-1028 (or 1012-1028) can be referred to collectively as an FRP iteration.

When the answer to step 1022 is no, or the answer to step 1028 is no, then there are no further potential modifications to consider adding to the FRP, and the current FRP (corresponding to a specific price scheme) is complete. In other words, when the answer to one of steps 1022 or 1028 is no, there are no more FRP iterations to perform for the specific price scheme being analyzed. Stated more generally, in accordance with an embodiment of the present invention the FRP iteration is repeated until no remaining potential modifications provides a financial benefit that can be used to achieve the financial objective, or until every potential modification has already been included in the FRP.

As was described above, it is likely that at least one fuel pricing structure is a TPS (e.g., a RTPS) having multiple pricing levels. Specific embodiments of the present invention accurately reflect how one or more TPSs affect determinations of whether potential modifications provide a financial benefit, and determinations of financial attractiveness and financial value, by taking into account whether and to what extent one or more of the potential modifications (e.g., ACMs) cause a transition between different pricing levels of the TPS. Advantageously, after an initial FRP iteration (within a price scheme), during each further FRP iteration (within the price scheme), determinations of whether potential modifications (e.g., ACMs) provide a financial benefit, and determinations of financial attractiveness and financial value, take into account how all previous FRP iterations (within the price scheme) have adjusted marginal prices associated with the TPS that are applicable to the current FRP iteration.

In accordance with specific embodiments of the present invention, each FRP iteration includes determining, for each ACM, whether the ACM provides a financial benefit that can be used to achieve the financial objective. Additionally, each FRP iteration includes determining a financial attractiveness corresponding to each ACM that provides a financial benefit that can be used to achieve the financial objective. Further, each FRP iteration includes identifying, as a successful ACM (SACM) to be added to the FRP, the ACM having a greatest financial attractiveness. In such embodiments, the FRP iteration is repeated a plurality of times, wherein during each iteration that follows an initial iteration, every ACM that was identified as a SACM during a previous iteration is removed from consideration.

In accordance with specific embodiments, to accurately determine whether an ACM provides a financial benefit, and to determine a corresponding financial attractiveness and financial value, an AIESC is determined based on a list of ESEs and corresponding performance profile and operating parameter information. Additionally, an AIEP 304 corresponding to the AIESC is determined based on the list of ESEs and corresponding fuel source and usage information. In such embodiments, the AIESC and the AIEP 304 characterize the energy system of the facility prior to any modifications. Further, a TBESC 222 is determined by modifying the most recently determined TBESC 222 if there was one, or by modifying the AIESC if there was no previously determined TBESC 222, to incorporate the most recently identified SACM. Additionally, a TBEP 304 corresponding to the most recently determined TBESC 222 is determined. Here, the TBESC 222 and the TBEP 304 characterize the energy system of the facility as it would be if the most recently identified SACM, and every previously identified SACM, if any, were implemented. In such embodiments, during a first FRP iteration, determinations of whether ACMs provide a financial benefit, and determinations of financial attractiveness and financial value, are performed relative to the AIESC and the AIEP 304. Then, during further FRP iterations (within a same price scheme), determinations of whether ACMs provide a financial benefit, and determinations of financial attractiveness and financial value, are performed relative to the most recently determined TBESC 222 and the most recently determined TBEP 304.

At step 1030 there is a determination of whether there is/are further price scheme(s) to analyze. If the answer to step 1030 is yes, then flow returns to step 1006, as indicated by arrow 1031. At this point steps 1006-1030, which can be referred to collectively as a price scheme iteration, are repeated for another price scheme.

If the answer to step 1032 is no, then flow proceeds to step 1032 where the one or more FRPs that have been generated is/are output and/or published. Alternatively, or additionally, it is possible that each FRP be output and/or published between steps 1028 and 1030.

Depending upon implementation, each published FRP can include one or more of the following, but is not limited thereto: a list of the potential modifications included in the FRP; the financial value of each potential modification included in the FRP; an indication of the financial attractiveness of each potential modification included in the FRP; and a total financial value of all the potential modifications included in the FRP. Where a separate FRP is determined for each of a plurality of different price schemes, a total financial value corresponding to each separate FRP can be determined to thereby enable the separate FRPs to be compared to one another. The ESC tool can perform such a comparison and identify the FRP that provides the greatest total financial value, or the comparison can be left to a user, administrator and/or manager.

The subject matter described herein may be embodied in systems, apparatus, methods, and/or articles depending on the desired configuration. In particular, various implementations of the subject matter described herein may be realized in computer software, firmware or hardware and/or combinations thereof, as well as in digital electronic circuitry, integrated circuitry, and the like. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, applications, components, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs), but not limited thereto) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a cathode ray tube (CRT) or liquid crystal display (LCD) monitor, but not limited thereto) for displaying information to the user and a keyboard, touch screen and/or a pointing device (e.g., a mouse, touchpad or a trackball, but not limited thereto) by which the user may provide input to the computer. Other kinds of devices may be used to provide for interaction with a user, administrator and/or manager as well; for example, feedback provided to the user, administrator and/or manager may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface (GUI) or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include, but are not limited to, a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Wherever possible, the same reference numbers will be used throughout the drawings to refer to the same or like parts.

While various embodiments of the present invention have been described above, it should be understood that they have been presented by way of example, and not limitation. It will be apparent to persons skilled in the relevant art that various changes in form and detail can be made therein without departing from the spirit and scope of the invention. For example, although a few variations have been described in detail above, other modifications or additions are possible. In particular, further features and/or variations may be provided in addition to those set forth herein. For example, the implementations described above may be directed to various combinations and sub-combinations of the disclosed features and/or combinations and sub-combinations of several further features disclosed above. In addition, the logic flow depicted in the accompanying figures and/or described herein do not require the particular order shown, or sequential order, to achieve desirable results. Other embodiments may be within the scope of the following claims.

Embodiments of the present invention have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof.

The breadth and scope of the present invention should not be limited by any of the above-described exemplary embodiments, but should be defined only in accordance with the following claims and their equivalents.

What is claimed is:

1. A method for generating a facility reconfiguration plan (FRP) to reconfigure an energy system of a facility to achieve a specified objective, the method comprising:
   (a) an energy model (EM) module implemented using at least one hardware processor obtaining, via a user interface and/or one or more databases, information about each of a plurality of energy system elements (ESEs) that are included in the energy system of the facility and in dependence thereon generating a characterization of the energy system of the facility and associated sources and uses of fuels prior to any modifications to the energy system of the facility;
   (b) an economic optimization model (EOM) module implemented using the at least one hardware processor receiving, from the EM module, the characterization of the energy system of the facility and associated sources and uses of fuels prior to any modifications to the energy system of the facility,
      computing characteristics of the energy system of the facility, prior to any modifications thereto, based on the characterization of the energy system of the facility and associated sources and uses of fuels, received by the EOM from the EM,
      determining or otherwise obtaining information regarding a plurality of potential modifications to the energy system of the facility, and
      determining, for each of the plurality of potential modifications to the energy system of the facility, an alternative configuration measure (ACM),
         wherein one or more of the ACMs corresponds to replacement of one or more of the ESEs included in the energy system of the facility prior to any modifications thereto, and
         wherein one or more further ones of the ACMs corresponds to addition of one or more ESEs not previously included in the energy system of the facility prior to any modifications thereto;
   (c) the EM module and EOM module utilizing the characterization of the energy system of the facility and associated sources and uses of fuels to determine which one of the ACMs is to be added to the FRP by,
      (c.1) the EOM module determining, for each of the ACMs not yet added to the FRP, whether the ACM provides a benefit that can be used to achieve the specified objective;
      (c.2) the EOM module determining a level of attractiveness corresponding to each ACM that provides a benefit that can be used to achieve the specified objective;
      (c.3) the EOM module identifying, as the ACM to be added to the FRP, the ACM having a greatest level of attractiveness; and
      (c.4) following the ACM identified at a most recent iteration of step (c.3) being added to the FRP, the EM module recomputing the characterization of the energy system of the facility, such that the recomputed characterization of the energy system of the facility accounts for changes associated with each of the one or more of the ACMs that has already added to the FRP as having actually been implemented, and the EM providing the recomputed characterization of the energy system of the facility to the EOM, thereby enabling the EOM to take into account during one or more further iterations of steps (c.1), (c.2) and (c.3) how replacements of one or more of the ESEs and additions of one or more ESEs affect one or more other ones of the ESEs;
   (d) the EM module and EOM module generating the FRP by repeating step (c) a plurality of times, wherein during each subsequent iteration of step (c) that follows an initial iteration of step (c), every ACM that was identified as providing a greatest level of attractiveness during a previous iteration of step (c), and thereby has already been added to the FRP, is accounted for as if the ACM were implemented and is removed from being a candidate for consideration as an ACM to be added to the FRP during the subsequent iteration;
   (e) determining based on results of steps (a), (b), (c) and (d) that one or more of the ESEs is/are to be replaced in the energy system of the facility and that one more ESEs is/are to be added to the energy system of the facility;
   (f) publishing the FRP to thereby identify the one or more of the ESEs to be replaced in the energy system of the facility and identify the one or more ESEs to be added the energy system of the facility; and
   (g) reconfiguring the energy system of the facility based on the published FRP by replacing one or more of the ESEs included in the energy system of the facility and/or by adding one or more ESEs to the energy system of the facility, wherein the ESEs being replaced and/or added are identified in the published FRP;
   wherein steps (a), (b), (c) and (d) are performed by a computer system or subsystem that includes the at least one hardware processor, and wherein the publishing the FRP comprises one or more of displaying the FRP on a display device of the computer system, producing a printout of the FRP and/or passing the FRP to another computer system or subsystem.

2. The method of claim 1, wherein:
   step (a) includes determining or otherwise obtaining
      (a.1) a list of the energy system elements (ESEs) included in the energy system of the facility;
      (a.2) corresponding fuel source, usage, performance profile and operating parameter information for each ESE included in the list of ESEs; and
      (a.3) corresponding pricing structure and pricing level information for each fuel source associated with the ESEs included in the list of ESEs;

step (b) includes determining or otherwise obtaining
  (b.1) a list of the alternative configuration measures (ACMs) by identifying a plurality of ACMs that each can be used to alter one or more of the ESEs included in the list of ESEs;
  (b.2) corresponding fuel source, usage, performance profile and operating parameter information for the ESEs in each ACM included in the list of ACMs; and
  (b.3) corresponding pricing structure and pricing level information for each fuel source associated with the ACMs included in the list of ACMs;
step (c.1) includes determining, for each ACM, whether the ACM provides a benefit that can be used to achieve the specified objective;
step (c.2) includes determining the level of attractiveness corresponding to each ACM that provides a benefit that can be used to achieve the specified objective; and
step (c.3) includes identifying, as a successful ACM (SACM) to be added to the FRP, the ACM having a greatest level of attractiveness; and
step (d) includes generating the FRP by repeating step (c) a plurality of times, wherein during each iteration of step (c) that follows an initial iteration of step (c), every ACM that was identified as a SACM during a previous iteration of step (c) is removed from consideration.

3. The method of claim 2, wherein:
step (a) also includes determining or otherwise obtaining
  an as-is energy system configuration (AIESC) based on the list of ESEs and corresponding performance profile and operating parameter information; and
  an as-is energy profile (AIEP) corresponding to the AIESC based on the list of ESEs and corresponding fuel source and usage information;
  wherein the AIESC and the AIEP characterize the energy system of the facility prior to any modifications; and
step (c) also includes determining
  a to-be energy system configuration (TBESC) by modifying the most recently determined TBESC if there was one, or by modifying the AIESC if there was no previously determined TBESC, to incorporate the most recently identified SACM; and
  a to-be energy profile (TBEP) corresponding to the most recently determined TBESC;
  wherein the TBESC and the TBEP characterize the energy system of the facility as it would be if the most recently identified SACM, and every previously identified SACM, if any, were implemented.

4. The method of claim 3, wherein:
a first time step (c) is performed, determinations of whether potential modifications provide a benefit, and determinations of level of attractiveness, are performed relative to the AIESC and the AIEP; and
each time step (c) is repeated, determinations of whether potential modifications provide a benefit, and determinations of level of attractiveness, are performed relative to the most recently determined TBESC and the most recently determined TBEP.

5. The method of claim 1, wherein:
the information that characterizes the energy system of the facility and associated sources and uses of fuels prior to any modifications includes fuel pricing structure information and corresponding pricing level information;
at least one fuel pricing structure comprises a tiered pricing structure (TPS) having at least two pricing levels;
a first time step (c) is performed, determinations of whether potential modifications provide a financial benefit, and determinations of financial attractiveness, take into account whether and to what extent one or more of the potential modifications cause a transition between different pricing levels of the TPS; and
each time step (c) is repeated, determinations of whether potential modifications provide a financial benefit, and determinations of financial attractiveness, take into account how all previous iterations of step (c) have adjusted marginal prices associated with the TPS that are applicable to the current iteration of step (c).

6. The method of claim 5, where the at least one fuel pricing structure that comprises a tiered pricing structure (TPS) comprises a reverse tiered pricing structure (RTPS).

7. The method of claim 1, wherein the specified objective, for which the FRP can be used to achieve, comprises one of the following:
maximize net operating gains associated with the energy system;
maximize changes to the energy system given a specified budget;
minimize carbon footprint of the energy system given a specified budget;
minimize dependency of the energy system on one or more specified fuel given a specified budget; and
offset a loss of wealth associated with implementing a specified desired modification to the energy system.

8. The method of claim 1, wherein the step of publishing the FRP comprising publishing the FRP such that the published FRP includes one or more of the following:
a list of the potential modifications included in the FRP;
a value of each potential modification included in the FRP;
an indication of the level of attractiveness of each potential modification included in the FRP; and
a total value of all the potential modifications included in the FRP.

9. The method of claim 1, further comprising:
performing steps (a)-(d) for each of a plurality of different price schemes, to thereby produce a separate FRP for each of the plurality of different fuel price schemes; and
determining a total value corresponding to each separate FRP to thereby enable the separate FRPs to be compared to one another.

10. The method of claim 1, further comprising:
obtaining one or more future preferences that specify a willingness and/or unwillingness to implement one or more specific potential modifications; and
wherein at step (b), one or more of the potential modifications is/are eliminated, added, bundled, prioritized or adjusted based on the one or more future preferences.

11. The method of claim 1, wherein step (c) is repeated until no remaining potential modifications provides a benefit that can be used to achieve the specified objective, or until every potential modification has already been included in the FRP.

12. The method of claim 1, wherein at step (c) determining a level of attractiveness is performed by determining one of the following:
a net operating gain metric equal to an operating gain nominal value less no implementation cost;
a net operating gain metric equal to an operating gain nominal value less some implementation cost nominal value;

a net operating gain metric equal to an operating gain nominal value less all implementation cost nominal value;
a net operating gain metric equal to an operating gain present value;
a net operating gain metric equal to an operating gain present value less some implementation cost present value;
a net operating gain metric equal to an operating gain present value less all implementation cost present value;
a capital efficiency ratio metric equal to a net operating gain divided by some implementation cost nominal value;
a capital efficiency ratio metric equal to a net operating gain divided by all implementation cost nominal value;
a capital efficiency ratio metric equal to a net operating gain divided by some implementation cost present value;
a capital efficiency ratio metric equal to a net operating gain divided by all implementation cost present value;
an extent of reducing carbon footprint or creating a carbon offset within a specified budget; and
an extent of reducing net demand or increasing net supply of one or more specified fuel with respect to an external vendor or buyer within a specified budget.

13. The method of claim 1, wherein at step (c.1) the determining, for each potential modification, whether the potential modification provides a benefit that can be used to achieve the specified objective, is a binary determination whose result is either yes or no.

14. The method of claim 2, wherein the list of ESEs includes at least three items selected from a group consisting of:
lighting equipment;
a dishwasher;
a clothes dryer;
a refrigerator;
a water heater;
air heating equipment;
air cooling equipment;
windows;
wall structure;
wall insulation;
ceiling structure;
ceiling insulation;
a swimming pool filter pump; and
photovoltaic solar panels.

15. The method of claim 2, wherein an ACM can alter one or more ESEs included in the list of ESEs in one or more of the following manners:
replacing one or more ESEs;
removing one or more ESEs;
adjusting a performance profile of one or more ESEs; and
adjusting one or more operating parameters of one or more ESEs.

16. The method of claim 2, wherein:
at least one of the ACMs comprises a variable ACM;
step (c.1) includes determining, for each of a plurality of different variations of each variable ACM, whether the variation of the variable ACM provides a benefit that can be used to achieve the specified objective;
step (c.2) includes determining a level of attractiveness corresponding to each of the plurality of variations of each variable ACM that provides a benefit that can be used to achieve the specified objective, if any; and
step (c.3) includes identifying, as a successful ACM (SACM) to be added to the FRP, the ACM having a greatest level of attractiveness, wherein the ACM having a greatest level of attractiveness may be one of the variations of a variable ACM.

17. A computer system for generating a facility reconfiguration plan (FRP) to reconfigure an energy system of a facility to achieve a specified objective, the system comprising:
an energy model (EM) module configured to characterize the energy system of the facility and associated sources and uses of fuels prior to any modifications to the energy system of the facility, the EM module implemented using at least one hardware processor;
an economic optimization model (EOM) module configured to
receive, from the EM module, the characterization of the energy system of the facility and associated sources and uses of fuels prior to any modifications to the energy system of the facility,
compute characteristics of the energy system of the facility, prior to any modifications thereto, based on the characterization of the energy system of the facility and associated sources and uses of fuels, received by the EOM from the EM
determine or otherwise obtain information regarding a plurality of potential modifications to the energy system of the facility, and
determine, for each of the plurality of potential modifications to the energy system of the facility, an alternative configuration measure (ACM),
wherein one or more of the ACMs corresponds to replacement of one or more of the ESEs included in the energy system of the facility prior to any modifications thereto, and
wherein one or more further ones of the ACMs corresponds to addition of one or more ESEs not previously included in the energy system of the facility prior to any modifications thereto,
wherein the EOM module is implemented using the at least one hardware processor; and
an interface configured to publish the FRP by displaying the FRP on a display device of the computer system, producing a printout of the FRP and/or passing the FRP to another computer system or subsystem;
the interface further configured to reconfigure the energy system of the facility based on the published FRP by replacing one or more of the ESEs included in the energy system of the facility and/or by adding of one or more ESEs to the energy system of the facility, wherein the ESEs being replaced and/or added are identified in the published FRP;
wherein the EOM and EM module are configured to utilize the characterization of the energy system of the facility and associated sources and uses of fuels to determine which one of the ACMs is to be added to the FRP by
(i) the EOM determining, for each for each of the ACMs not yet added to the FRP, whether the ACM provides a benefit that can be used to achieve the specified objective;
(ii) the EOM determining a level of attractiveness corresponding to each ACM that provides a benefit that can be used to achieve the specified objective;
(iii) the EOM identifying, as the ACM to be added to the FRP, the ACM having a greatest level of attractiveness; and following the ACM identified at a most recent iteration of (iii) being added to the FRP, the EM module recomputing the characterization of the energy system of the facility, such that the recomputed characterization of the energy system of the facility accounts for changes associated with each of the one or more of the ACMs that has already added to the FRP as having actually been implemented, and the EM provides the recomputed characterization of the energy system of the facility to the EOM, thereby enabling the EOM to take into account during one or more further iterations of (i), (ii) and (iii) how replacements of one or more of the ESEs and additions of one or more ESEs affect one or more other ones of the ESEs; and wherein the FRP is generated by repeating (i), (ii) and (iii) a plurality of times, wherein during each subsequent iteration of (i), (ii) and (iii) that follows an initial iteration, every potential modification that was identified as providing a greatest level of attractiveness during a previous iteration, and thereby has already been added to the FRP, is accounted for as if the potential modification were implemented and is removed from being a candidate for consideration as a potential modification to be added to the FRP during the subsequent iteration.

18. The system of claim 17, wherein:

the information that characterizes the energy system of the facility and associated sources and uses of fuels prior to any modifications includes fuel pricing structure information and corresponding pricing level information;

at least one fuel pricing structure comprises a tiered pricing structure (TPS) having at least two pricing levels;

when the initial iteration of (i), (ii) and (iii) is performed, determinations of whether potential modifications provide a financial benefit, and determinations of financial attractiveness, take into account whether and to what extent one or more of the potential modifications cause a transition between different pricing levels of the TPS; and when each subsequent iteration of (i), (ii) and (iii) is performed, determinations of whether potential modifications provide a financial benefit, and determinations of financial attractiveness, take into account how all previous iterations of (i), (ii) and (iii) have adjusted marginal prices associated with the TPS that are applicable to the current iteration of (i), (ii) and (iii).

19. The system of claim 18, where the at least one fuel pricing structure that comprises a tiered pricing structure (TPS) comprises a reverse tiered pricing structure (RTPS).

20. The system of claim 17, wherein the specified objective, for which the FRP can be used to achieve, comprises one of the following:

maximize net operating gains associated with the energy system;

maximize changes to the energy system given a specified budget;

minimize carbon footprint of the energy system given a specified budget;

minimize dependency of the energy system on one or more specified fuel given a specified budget; and offset a loss of wealth associated with implementing a specified desired modification to the energy system.

21. The system of claim 17, wherein:

the EOM module is further configured to obtain one or more future preferences that specify a willingness and/or unwillingness to implement one or more specific potential modifications; and one or more of the potential modifications is/are eliminated, added, bundled, prioritized or adjusted based on the one or more future preferences.

22. The system of claim 17, wherein (i), (ii) and (iii) are repeated until no remaining potential modifications provides a benefit that can be used to achieve the specified objective, or until every potential modification has already been included in the FRP.

23. The system of claim 17, wherein the EOM determining a level of attractiveness is performed by the EOM determining one of the following:

a net operating gain metric equal to an operating gain nominal value less no implementation cost;

a net operating gain metric equal to an operating gain nominal value less some implementation cost nominal value;

a net operating gain metric equal to an operating gain nominal value less all implementation cost nominal value;

a net operating gain metric equal to an operating gain present value;

a net operating gain metric equal to an operating gain present value less some implementation cost present value;

a net operating gain metric equal to an operating gain present value less all implementation cost present value;

a capital efficiency ratio metric equal to a net operating gain divided by some implementation cost nominal value;

a capital efficiency ratio metric equal to a net operating gain divided by all implementation cost nominal value;

a capital efficiency ratio metric equal to a net operating gain divided by some implementation cost present value;

a capital efficiency ratio metric equal to a net operating gain divided by all implementation cost present value;

an extent of reducing carbon footprint or creating a carbon offset within a specified budget; and an extent of reducing net demand or increasing net supply of one or more specified fuel with respect to an external vendor or buyer within a specified budget.

\* \* \* \* \*